US011225578B2

(12) United States Patent
Ippolito et al.

(10) Patent No.: US 11,225,578 B2
(45) Date of Patent: Jan. 18, 2022

(54) ALKOXYSILANE TREATMENT OF A CALCIUM CARBONATE-COMPRISING MATERIAL

(71) Applicant: Omya International AG, Oftringen (CH)

(72) Inventors: Fabio Ippolito, Oftringen (CH); Samuel Rentsch, Spiegel bei Bern (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 135 days.

(21) Appl. No.: 15/780,088

(22) PCT Filed: Jan. 11, 2017

(86) PCT No.: PCT/EP2017/050492
§ 371 (c)(1),
(2) Date: May 30, 2018

(87) PCT Pub. No.: WO2017/121763
PCT Pub. Date: Jul. 20, 2017

(65) Prior Publication Data
US 2018/0355182 A1    Dec. 13, 2018

Related U.S. Application Data

(60) Provisional application No. 62/281,245, filed on Jan. 21, 2016.

(30) Foreign Application Priority Data

Jan. 14, 2016   (EP) ..................... 16151385

(51) Int. Cl.
| | | |
|---|---|---|
| *C09C 1/02* | (2006.01) | |
| *C08K 9/06* | (2006.01) | |
| *C09D 7/62* | (2018.01) | |
| *C08K 3/26* | (2006.01) | |
| *C09J 11/04* | (2006.01) | |
| *D21H 17/69* | (2006.01) | |
| *D21H 19/42* | (2006.01) | |
| *C09C 3/12* | (2006.01) | |

(52) U.S. Cl.
CPC ............. *C09C 1/021* (2013.01); *C08K 3/26* (2013.01); *C08K 9/06* (2013.01); *C09D 7/62* (2018.01); *C09J 11/04* (2013.01); *D21H 17/69* (2013.01); *D21H 19/42* (2013.01); *C01P 2004/51* (2013.01); *C01P 2004/61* (2013.01); *C01P 2004/62* (2013.01); *C01P 2006/12* (2013.01); *C08K 2003/265* (2013.01); *C08K 2201/006* (2013.01); *C09C 3/12* (2013.01)

(58) Field of Classification Search
CPC .................................................. C09C 1/021

USPC ........................................... 427/212
See application file for complete search history.

(56) References Cited

U.S. PATENT DOCUMENTS

| | | | | |
|---|---|---|---|---|
| 4,374,178 A | * | 2/1983 | Kulkarni ................ | C08K 9/06 428/404 |
| 2004/0020410 A1 | | 2/2004 | Gane et al. | |
| 2004/0097616 A1 | | 5/2004 | Hoppler et al. | |
| 2005/0276897 A1 | * | 12/2005 | Nover ................... | C01F 11/185 426/594 |

FOREIGN PATENT DOCUMENTS

| | | |
|---|---|---|
| CA | 1193380 A | 9/1985 |
| CN | 1373164 A | 10/2002 |
| CN | 103555032 A | 2/2014 |
| CN | 103980677 A | 8/2014 |
| EP | 1967553 A | 9/2008 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2524898 A1 | 11/2012 |
| EP | 2576703 A1 | 4/2013 |
| EP | 2722368 A1 | 4/2014 |
| EP | 2770017 A1 | 8/2014 |
| EP | 2840065 A1 | 2/2015 |
| JP | H06285363 A | 10/1994 |
| JP | H0848910 A | 2/1996 |
| JP | 2002173611 A | 6/2002 |
| JP | 2006188413 A | 7/2006 |
| JP | 2014047320 A | 3/2014 |
| WO | 0039222 A1 | 7/2000 |
| WO | 2004083316 A1 | 9/2004 |
| WO | 2005121257 A2 | 12/2005 |

(Continued)

OTHER PUBLICATIONS

Doufnoune, The interactions of Silane and Zirconate Coupling Agents with Calcium Carbonate, International Journal of Polymeric Materials, 56:227-246, 2007 (Year: 2007).*
Gane et al. (1996) "Void Space Structure of Compressible Polymer Spheres and Consolidated Calcium Carbonate Paper-Coating Formulations" Industrial and Engineering Chemistry Research, vol. 35, No. 5, pp. 1753-1764.
Gelest (2006) "Hydrophobicity, Hydrophilicity and Silane Surface Modification", 76 pages.
Gelest (2011) "Hydrophobicity, Hydrophilicity and Silane Surface Modification", version 2.0, 84 pages.

(Continued)

*Primary Examiner* — Tabatha L Penny
(74) *Attorney, Agent, or Firm* — ALGM LLP; Harry J. Guttman

(57) ABSTRACT

Some embodiments of the invention include a process for the surface-treatment of a calcium carbonate-comprising material, a surface-treated calcium carbonate-comprising material obtained by such a process and the use of such a surface-treated calcium carbonate-comprising material.

16 Claims, No Drawings

(56) References Cited

FOREIGN PATENT DOCUMENTS

| | | |
|---|---|---|
| WO | 2009074492 A1 | 6/2009 |
| WO | 2013142473 A1 | 9/2013 |
| WO | 2014110202 A1 | 7/2014 |

OTHER PUBLICATIONS

Shimpi et al.(2015) "Synthesis and surface modification of calcium carbonate nanoparticles using ultrasound cavitation technique" Nanoscience and Nanoengineering, vol. 3, No. 1, pp. 8-12.

The International Search Report dated Feb. 28, 2017 from PCT/EP2017/050492.

The Written Opinion of the International Searching Authority dated Feb. 28, 2017 from PCT/EP2017/050492.

Blagojević et al., "Silane pre-treatment of calcium carbonate nanofillers for polyurethane composites," e-Polymers, No. 036, Jun. 9, 2004, pp. 1-14.

CN 1373164A, English language abstract from Espacenet, Oct. 9, 2002 (1 page).

CN 103555032A, English language abstract from Espacenet, Feb. 5, 2014(1 page).

JP 2006188413A, English language abstract from Espacenet, Jul. 20, 2006 (1 page).

JP H06285363A, English language abstract from Espacenet, Oct. 11, 1994 (1 page).

\* cited by examiner

ALKOXYSILANE TREATMENT OF A CALCIUM CARBONATE-COMPRISING MATERIAL

CROSS-REFERENCE TO RELATED APPLICATIONS

This is a U.S. national phase of PCT Application No. PCT/EP2017/050492, filed Jan. 11, 2017, which claims priority to U.S. Provisional Application No. 62/281,245, filed Jan. 21, 2016 and European Application No. 16151385.8, filed Jan. 14, 2016.

The present invention relates to a process for the surface-treatment of a calcium carbonate-comprising material, to a surface-treated calcium carbonate-comprising material obtained by such a process and the use of such a surface-treated calcium carbonate-comprising material.

Especially in the field of synthetic or bio sourced polymer compositions, in paper making, paper coatings, agricultural applications, paints, adhesives, sealants, composite materials, wood composite materials, construction applications, pharma applications and/or cosmetic applications the use of a surface-treated calcium carbonate-comprising material is highly desirable, especially the use of a calcium carbonate-comprising material that is surface-treated with alkoxysilanes. Generally, these surface-treated calcium carbonate-comprising materials show improved properties, especially, improved hydrophobicity.

Various processes are known for producing such surface-treated calcium carbonate-comprising materials.

EP 1 967 553 A1 refers to water-repellent inorganic powder and a process for the production thereof. The process comprises a first step of adding to an inorganic powder an aqueous emulsion of a silicone compound having a group reactive with the inorganic powder, followed by mixing and stirring in a substantially dried state for surface-treating the inorganic powder, and a second step of heating the treated inorganic powder to bake the silicon compound to the surface of the inorganic powder and at the same time, separating the aqueous medium of the aqueous emulsion. However, according to EP 1 967 553 A1 an aqueous emulsion of a silicone compound has to be prepared in a first step.

JP H 0848910 refers to surface-treated metal oxides and a method for producing the same. The metal oxides may be treated with alkoxysilanes but the treatment is performed in a solvent like benzene, toluene, xylene, hexane etc.

In the article "silane pre-treatment of calcium carbonate nanofillers for polyurethane composites" by S. L. Blagojevic et al., e-Polymers, 2004, no. 036, calcium carbonate is surface-treated with γ-aminopropyltriethoxysilane and γ-glycidoxypropyltrimethoxysilane. This surface-treatment is carried out in 1-propanol.

In the article "synthesis and surface modification of calcium carbonate nanoparticles using ultrasound cavitation technique" by N. Shimpi et al., Nanoscience and Nanoengineering, 3(1): 8-12, 2015, calcium carbonate nanoparticles are surface treated with triethoxyvinylsilane (TEVS). The calcium carbonate nanoparticles as well as the TEVS are dispersed/dissolved in acetone and afterwards are mixed under ultrasound environment.

However, it is desirably that the surface-treatment step is carried out in water and not in organic solvents due to economic and ecological reasons. Furthermore, it is desirable that the surface-treatment step in water can be easily processed without complex and expensive or time-consuming intermediate steps and, therefore, the preparation of, for example, aqueous emulsions of the surface-treatment agent before adding to the aqueous suspension of the calcium carbonate-comprising material is undesirable.

JP 2002 173611 refers to surface modified inorganic particles. The particles are obtained by dispersing inorganic particles in water or an organic solvent, adding an organic silicon compound and subjecting the obtained slurry to dehydration or drying.

CA 1 193 380 refers to filler of silanated calcium carbonate pre-treated with soluble sodium silicates. According to the wet slurry process disclosed in CA 1 193 380 calcium carbonate is mixed with two or three times its weight in water. Afterwards sodium silicate and silane is added to the slurry.

WO 2014/110202 refers to the treatment for non-caking mine rock dust. The anti-caking mine rock dust includes an inorganic particulate material treated with at least one surface treatment. The surface treatment may include a silane or siloxane and the inorganic particulate may include calcium carbonate. The surface treatment process may be a "wet" process that generally includes reacting the at least one silane onto the inorganic particulate material in at least one solvent, for example water.

In the product leaflet "Hydrophobicity, Hydrophilicity and Silane Surface Modification" from Gelest Inc., published in 2006, the effectiveness of silane surface-treatment agents on several inorganics is disclosed. The effectiveness for calcium carbonate-comprising materials, for example marble or chalk, is merely rated with "SLIGHT".

However, it is not only important that the surface of the calcium carbonate-comprising material can be treated by a cheap, simple and non time-consuming process but it is also important that the effectiveness of the surface-treatment agent for the calcium carbonate-comprising material can be improved and/or that the surface-treated calcium carbonate-comprising material shows improved properties compared to the neat calcium carbonate-comprising material. The surface properties, for example, hydrophobicity are the better the more of the surface of the calcium carbonate-comprising material is coated by the hydrophobic surface-treatment agent. Furthermore, the attachment of the surface-treatment agent has to be strong in order to avoid the detachment of the surface-treatment agent in a subsequent treatment or processing step. However, by the processes known in the prior art the surface-treatment agents are attached very weakly and often in a very low amount to the surfaces of the treated material and, therefore, these surface-treatment agents can be washed of, at least partially, in a simple washing step. Therefore, the surface-treated material may at least partially, for example, lose its hydrophobic character. Such a washing step may be omitted and the surface-treated material may just be dried after the surface-treatment process. However, if such an unwashed surface-treated material is used in a product or process, the surface-treatment agent may detach and may be present in the product as "free" surface-treatment agent and may have a negative impact on the product. Furthermore, if the surface-treated calcium carbonate-comprising material is used in a surrounding or matrix material, for example, a synthetic or bio sourced polymer formulation, the connection of the surface-treated calcium carbonate-comprising material with the matrix may be negatively affected if the surface-treatment agent detaches from the surface-treated calcium carbonate-comprising material.

However, none of the foregoing documents explicitly mentions efficient manufacturing methods for preparing improved surface-treated calcium carbonate-comprising materials and especially does not mention a process that provides surface-treated calcium carbonate-comprising materials, wherein the surface-treatment agent is attached stronger to the calcium carbonate-comprising material.

Thus, there is a continuous need for a process for providing surface-treated calcium carbonate-comprising materials which have an improved performance compared to existing surface-treated calcium carbonate-comprising materials and especially a process for providing a surface-treated calcium carbonate-comprising material wherein the surface-treatment agent is attached stronger to the calcium carbonate-comprising material compared to surface-treated calcium carbonate-comprising materials prepared by conventional processes.

Accordingly, it is an objective of the present invention to provide a process for preparing a surface-treated calcium carbonate-comprising material having improved surface characteristics, like a high hydrophobicity or the ability to react with surrounding materials. A further objective is to provide a process for preparing a surface-treated calcium carbonate-comprising material imparting improved mechanical properties to final application products such as a surrounding or matrix material, for example, a synthetic or bio sourced polymer formulation.

A further objective is to provide a process for preparing a surface-treated calcium carbonate-comprising material, wherein the surface-treatment agent is attached stronger to the calcium carbonate-comprising material compared to surface-treated calcium carbonate-comprising materials prepared by conventional processes.

A further objective is to provide a process for preparing a surface-treated calcium carbonate-comprising material that can be carried out under cost-efficient, time-saving and ecological conditions, i.e. by avoiding or reducing the use of organic solvents as well as by avoiding complex and expensive or time-consuming intermediate steps. Another object is to provide a process for preparing a surface-treated calcium carbonate-comprising material, wherein a high amount of the surface-treatment agent can be located on the surface of the calcium carbonate-comprising material. Further objectives can be gathered from the following description of the invention.

The foregoing and other objectives are solved by the subject-matter as defined herein in claim 1.

Advantageous embodiments of the inventive a process for preparing a surface-treated calcium carbonate-comprising material are defined in the corresponding sub-claims.

According to one aspect of the present invention a process for the surface-treatment of a calcium carbonate-comprising material is provided, the process comprising the steps of:

a) providing an aqueous suspension of at least one calcium carbonate-comprising material having a solids content in the range from 5 to 90 wt.-%, based on the total weight of the aqueous suspension, b) adjusting the pH-value of the aqueous suspension of step a) to a range from 7.5 to 12, c) adding at least one surface-treatment agent to the aqueous suspension obtained in step b) in an amount ranging from 0.05 to 10 mg surface treatment agent per $m^2$ of the surface area of the at least one calcium carbonate-comprising material as provided in step a), wherein the at least one surface treatment agent is a compound according to Formula (I),

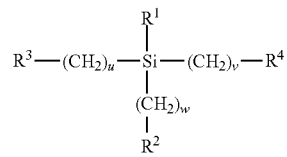

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group, and u, v and w are independently from each other an integer from 0 to 24, d) mixing the aqueous suspension obtained in step c) at a temperature in the range from 30 to 120° C., and e) drying the aqueous suspension during or after step d) at a temperature in the range from 40 to 160° C. at ambient or reduced pressure until the moisture content of the obtained surface-treated calcium carbonate-comprising material is in the range from 0.001 to 20 wt.-%, based on the total weight of the surface-treated calcium carbonate-comprising material.

The inventors surprisingly found out that by the foregoing process it is possible to prepare surface-treated calcium carbonate-comprising materials having improved surface characteristics, like a high hydrophobicity or the ability to react with surrounding materials. Furthermore, by the process according to the present invention a surface-treated calcium carbonate-comprising material is provided, wherein the surface-treatment agent is attached stronger to the calcium carbonate-comprising material compared to surface-treated calcium carbonate-comprising materials prepared by conventional processes. Furthermore, by the process according to the present invention a high amount of surface-treatment agent can be located on the surface of the calcium carbonate-comprising material.

Furthermore, the inventors found that the process according to the present invention can be performed in water and, therefore, organic solvents can be reduced or avoided in the inventive process. Furthermore, the process according to the present invention can be prepared by mixing the educts and, therefore intermediate steps as preparing emulsions can be avoided in the present process.

According to another aspect of the present invention a surface-treated calcium carbonate-comprising material is obtained by the process according to the present invention.

According to another aspect of the present invention the obtained surface-treated calcium carbonate-comprising material may be used in a synthetic or bio sourced polymer composition, in paper making, paper coatings, agricultural applications, paints, adhesives, sealants, composite materials, wood composite materials, construction applications, pharma applications and/or cosmetic applications. Furthermore, the obtained surface-treated calcium carbonate-comprising material may be used in a surrounding material, wherein the surface treatment agent of the surface-treated calcium carbonate-comprising material is undergoing a reaction with the surrounding material.

The inventors also found that the surface-treated calcium carbonate-comprising material obtained by the process according to the present invention provides improved surface characteristics, like a high hydrophobicity or the ability to react with surrounding materials. Furthermore, the surface-treatment agent is attached stronger to the calcium carbonate-comprising material compared to surface-treated calcium carbonate-comprising materials prepared by conventional processes. Therefore, the surface-treated calcium carbonate-comprising material can be used in final application products such as a surrounding or matrix material, for example, a synthetic or bio sourced polymer composition. Due to the stronger attachment of the surface-treatment agent according to claim 1 on the surface of the calcium carbonate-comprising material the surface-treatment agent may not or just in small amounts detach from the calcium carbonate-comprising material when present, for example, in a synthetic or bio sourced polymer composition.

Advantageous embodiments of the present invention are defined in the corresponding sub-claims.

According to one embodiment of the present invention the pH-value in step b) is adjusted to the range from 7.5 to 12 by adding at least one base.

According to one embodiment of the present invention the at least one calcium carbonate-comprising material is selected from the group consisting of ground calcium carbonate, preferably marble, limestone, dolomite and/or chalk, precipitated calcium carbonate, preferably vaterite, calcite and/or aragonite, surface-reacted calcium carbonate, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof and more preferably the at least one calcium carbonate-comprising material is a surface-reacted calcium carbonate.

According to another embodiment of the present invention mechanical dewatering, preferably by centrifugation or filtration, is carried out during step d), and/or the surface-treated calcium carbonate-comprising material is washed with water during and/or after step d).

According to another embodiment of the present invention the process of the present invention comprises a further step f) of adding at least one base to the aqueous suspension during or after step c) to readjust the pH-value to the range from 7.5 to 12, preferably from 8 to 11.5 and most preferably from 8.5 to 11 during or after step d).

According to another embodiment of the present invention $R^1$, $R^2$, $R^3$ and/or $R^4$ are independently from each other a methoxy or an ethoxy group, and/or the at least one surface-treatment agent is selected from triethoxysilane and/or trimethoxysilane and preferably is selected from the group consisting of triethoxyvinylsilane, trimethoxyvinylsilane, 3-(2,3-epoxypropoxy)propyl-trimethoxysilane, triethoxysilylpropyltetrasulphide, 3-mercaptopropyltrimethoxysilane, 3-methacryloxypropyltrimethoxysilane, 3-aminopropyltriethoxysilane, methyltriethoxysilane, 3-glycidoxypropyltrimethoxysilane, dodecyltriethoxysilane, n-octadecyltriethoxysilane, phenyltriethoxysilane, 3-butenyltriethoxysilane and combinations thereof and most preferably is triethoxyvinylsilane and/or trimethoxyvinylsilane.

According to another embodiment of the present invention the solids content of the aqueous suspension of step a) is in the range from 10 to 70 wt.-%, preferably in the range from 15 to 60 wt.-% and most preferably in the range from 18 to 40 wt.-%, based on the total weight of the aqueous suspension; and/or the calcium carbonate-comprising material is a surface-reacted calcium carbonate and the specific surface area of the surface-reacted calcium carbonate as measured by the BET nitrogen method according to ISO 9277:2010 is in the range from 1 to 250 m²/g, preferably in the range from 2 to 200 m²/g and most preferably in the range from 35 to 150 m²/g or the calcium carbonate-comprising material is a ground calcium carbonate or a precipitated calcium carbonate and the specific surface area of the ground calcium carbonate or the precipitated calcium carbonate as measured by the BET nitrogen method according to ISO 9277:2010 is in the range from 1 to 100 m²/g, preferably in the range from 2 to 60 m²/g and most preferably in the range from 3 to 8 m²/g.

According to another embodiment of the present invention the at least one base of step b) is selected from the group consisting of calcium hydroxide, magnesium hydroxide, calcium hydrogen carbonate, sodium hydroxide, potassium hydroxide, lithium hydroxide, ammonium hydroxide, primary, secondary and tertiary amines and mixtures thereof, more preferably is calcium hydroxide and/or ammonium hydroxide and most preferably is calcium hydroxide.

According to another embodiment of the present invention the pH-value is adjusted in process step b) to the range from 7.8 to 11.5 and more preferably to the range from 8 to 11.

According to another embodiment of the present invention the amount of the at least one surface-treatment agent added in step c) is in the range from 0.07 to 9 mg surface-treatment agent per m² of the surface area of the calcium carbonate-comprising material, preferably in the range from 0.1 to 8 mg surface-treatment agent per m² of the surface area of the calcium carbonate-comprising material and most preferably in the range from 0.11 to 5 mg surface-treatment agent per m² of the surface area of the calcium carbonate-comprising material.

According to another embodiment of the present invention step d) is carried out at a temperature in the range from 45 to 115° C., preferably from 50 to 105° C. and more preferably in the range from 80 to 100° C., and/or for a period of time ranging from 1 s to 60 min.

According to another embodiment of the present invention step e) is carried out until the moisture content of the obtained surface-treated calcium carbonate-comprising material is in the range from 0.005 to 15 wt.-%, preferably in the range from 0.01 to 10 wt.-% and more preferably from 0.05 to 5 wt.-%, based on the total weight of the surface-treated calcium carbonate-comprising material.

According to another embodiment of the present invention step e) is carried out at a temperature in the range from 50 to 155° C., preferably from 70 to 150° C. and more preferably from 80 to 145° C.

According to another embodiment of the present invention the at least one base added in step f) is selected from the group consisting of lithium hydroxide, sodium hydroxide, potassium hydroxide, calcium hydroxide, magnesium hydroxide and mixtures thereof.

According to another embodiment of the present invention the process according to the present invention comprises a further step g) after or during step e) of deagglomerating the surface-treated calcium carbonate-comprising material of step d) or e), and preferably step g) is carried out during step e).

According to another embodiment of the present invention all process steps are fully or partially batch or continuous processes, wherein a batch process is preferred for steps a) to d) and f) and g) and a continuous process is preferred for step e).

According to another embodiment of the present invention the surrounding material is a synthetic or bio sourced polymer formulation, preferably a polyolefin formulation, a polyvinylchloride formulation or a polyester formulation and the reaction is a crosslinking reaction.

It should be understood that for the purposes of the present invention, the following terms have the following meanings:

A "calcium carbonate-comprising material" in the meaning of the present invention refers to a material which is a source of calcium carbonate and preferably is selected from ground calcium carbonate, precipitated calcium carbonate, surface-reacted calcium carbonate, dolomite and mixtures thereof.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example, by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium- and carbonate salts, calcium chloride and sodium carbonate for example, in an aqueous environment. PCC may have a vateritic, calcitic or aragonitic crystalline form. PCCs are described, for example, in EP 2 447 213 A1, EP 2 524 898 A1, EP 2 371 766 A1, EP 2 840 065 A1, or WO 2013/142473 A1.

A "surface-reacted calcium carbonate" according to the present invention is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source. A $H_3O^+$ ion donor in the context of the present invention is a Brønsted acid and/or an acid salt.

The term "dry" or "dried" material is understood to be a material having between 0.001 to 20 wt.-% of water, based on the total weight of the surface-treated calcium carbonate-comprising material weight. The % water (equal to "moisture content") is determined gravimetrically as the weight loss upon heating to 150° C. "Drying" in the sense of the present invention means that heating is carried out until the moisture content of the surface-treated calcium carbonate-comprising material is in the range from 0.001 to 20% by weight, based on the total weight of the surface-treated calcium carbonate-comprising material weight.

The "particle size" of particulate materials other than surface-reacted calcium carbonate-comprising mineral material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. The $d_{98}$ value is the particle size at which 98 wt.-% of all particles are smaller than that particle size. Particle sizes were determined by using a Sedigraph™ 5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

The "particle size" of surface-reacted calcium carbonate-comprising mineral material herein is described as volume-based particle size distribution. Therein, the value $d_x$ represents the diameter relative to which x % by volume of the particles have diameters less than $d_x$. This means that, for example, the $d_{20}$ value is the particle size at which 20 vol.-% of all particles are smaller than that particle size. The $d_{50}$ value is thus the volume median particle size, i.e. 50 vol.-% of all particles are smaller than that particle size and the $d_{98}$ value is the particle size at which 98 vol.-% of all particles are smaller than that particle size. For determining the volume-based particle size distribution, e.g., the volume-based median particle diameter ($d_{50}$) or the volume-based top cut particle size ($d_{98}$) of the surface-reacted calcium carbonate-comprising mineral material, a Malvern Mastersizer 2000 Laser Diffraction System was used. The raw data obtained by the measurement are analysed using the Mie theory, with a defined RI (particle refractive index) of 1.57 and iRI (absorption index) of 0.005 and Malvern Application Software 5.60. The measurement was performed with an aqueous dispersion. For this purpose, the samples were dispersed using a high-speed stirrer. The weight determined particle size distribution may correspond to the volume determined particle size if the density of all the particles is equal. Alternatively, the "particle size" may be defined by the weight median diameter.

A "specific surface area (SSA)" of a calcium carbonate-comprising material in the meaning of the present invention is defined as the surface area of the calcium carbonate-comprising material divided by its mass. As used herein, the specific surface area is measured by nitrogen gas adsorption using the BET isotherm (ISO 9277:2010) and is specified in $m^2/g$.

The term "surface area" or "outer surface" in the meaning of the present invention refers to the surface of the calcium carbonate-comprising material particle that is accessible for nitrogen as used for measuring the BET according to ISO 9277:2010. In this regard, it should be noted that the amount of surface-treatment agent according to claim 1 required for full saturation of the surface area is defined as a monolayer concentration. Higher concentrations thus can be chosen by forming bilayered or multi-layered structures on the surface of the calcium carbonate-comprising material particle.

For the purpose of the present invention, the term "viscosity" or "Brookfield viscosity" refers to Brookfield viscosity. The Brookfield viscosity is for this purpose measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 s after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

For the purpose of the present application, "water-insoluble" materials are defined as materials which, when 100 g of said material is mixed with 100 g deionised water and filtered on a filter having a 0.2 µm pore size at 20° C. to recover the liquid filtrate, provide less than or equal to 0.1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 µm pore size at 20° C. to recover the liquid filtrate, provide more than 0.1 g of recovered solid material following evaporation at 95 to 100° C. of 100 g of said liquid filtrate at ambient pressure.

A "suspension" or "slurry" in the meaning of the present invention comprises insoluble solids and a solvent or liquid, preferably water, and optionally further additives, and usually contains large amounts of solids and, thus, is more viscous and can be of higher density than the liquid from which it is formed.

The term "surface-treatment agent" according to the present invention is an agent that is used to treat the surface of the at least one calcium carbonate-comprising material. The surface-treatment agent of the present invention is a silane agent that comprises at least one hydrolysable alkoxy group attached to the Si atom. The "hydrolysable alkoxy group" attached to the Si atom according to the present invention hydrolyses readily with water to form a silanol Si—OH group.

A "surface-treated calcium carbonate-comprising material" in the gist of the present invention comprises at least a calcium carbonate-comprising material which has been contacted with at least one surface-treatment agent according to the present invention such as to obtain a treatment layer located on at least a part of the surface of the calcium-comprising material. Accordingly, the term "treatment layer" refers to a layer comprising the surface treatment agent and reaction products thereof on at least a part of the surface of the calcium carbonate-comprising material. The term "reaction products" in the meaning of the present invention refers to products obtained by contacting the at least one calcium carbonate-comprising material with at least one surface-treatment agent according to the present invention.

The term "base" according to the present invention refers to a base as defined by the Brønsted-Lowry theory. Therefore, a base in the meaning of the present invention is a substance that can accept hydrogen ions ($H^+$)—otherwise known as protons.

The term "surrounding material" in the meaning of the present invention refers to a matrix material that comprises the surface-treated calcium carbonate-comprising material as filler.

A "crosslinking reaction" according to the present invention is defined as a reaction between the surrounding material and the surface-treatment agent that is located on the surface of the surface-treated calcium carbonate-comprising material. Due to this reaction a bond is created between the surrounding material and the surface-treatment agent that is located on the surface of the surface-treated calcium carbonate-comprising material, wherein the bond is a chemical bond or an ionic bond.

The "hydrophobicity" of the surface-treated calcium carbonate-comprising material is evaluated at +23° C. (±2° C.) by determining the minimum water to ethanol ratio in a volume/volume based water/ethanol-mixture needed for the settling 50 wt.-% of said surface-treated calcium carbonate-comprising material, where said material is deposited on the surface of said water ethanol-mixture by passage through a house hold tea sieve. The volume/volume base is related to the volumes of both separate liquids before blending them together and do not include the volume contraction of the blend.

The term "solid" according to the present invention refers to a material that is solid under standard ambient temperature and pressure (SATP) which refers to a temperature of 298.15 K (25° C.) and an absolute pressure of exactly 100 000 Pa (1 bar, 14.5 psi, 0.98692 atm). The solid may be in the form of a powder, tablet, granules, flakes etc.

The term "liquid" according to the present invention refers to a material that is liquid under standard ambient temperature and pressure (SATP) which refers to a temperature of 298.15 K (25° C.) and an absolute pressure of exactly 100 000 Pa (1 bar, 14.5 psi, 0.98692 atm). It is to be noted that the liquid may be a neat liquid or a solution which further comprises a solvent, preferably water. The liquid may also comprise insoluble solids and thus may form a suspension or dispersion.

The term "gas" according to the present invention refers to a material that is gaseous under standard ambient temperature and pressure (SATP) which refers to a temperature of 298.15 K (25° C.) and an absolute pressure of exactly 100 000 Pa (1 bar, 14.5 psi, 0.98692 atm).

The term "ambient pressure" according to the present invention refers to the standard ambient temperature pressure (SATP) which refers to an absolute pressure of exactly 100 000 Pa (1 bar, 14.5 psi, 0.98692 atm). The term "reduced pressure" refers to a pressure below the "ambient pressure".

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

As set out above, the inventive process for preparing a surface-treated calcium carbonate-comprising material comprises at least the process steps of a), b), c), d) and e). In the following, it is referred to further details of the present invention and especially the foregoing steps of the inventive process for preparing a surface-treated calcium carbonate-comprising material.

Characterisation of Step a): Provision of at Least One Calcium Carbonate-Comprising Material According to step a) of the process of the present invention, an aqueous suspension of at least one calcium carbonate-comprising material having a solids content in the range from 5 to 90 wt.-%, based on the total weight of the aqueous suspension is provided.

The expression "at least one" calcium carbonate-comprising material means that one or more, for example, two or three calcium carbonate-comprising materials may be present in the aqueous suspension provided in step a). According to a preferred embodiment only one calcium carbonate-comprising material is present in the aqueous suspension provided in step a).

According to one embodiment of the present invention the at least one calcium carbonate-comprising material has a content of calcium carbonate of at least 30 wt.-%, preferably 40.-%, more preferably 50 wt.-%, even more preferably 75 wt.-%, even more preferably 90 wt.-%, and most preferably 95 wt.-%, based on the total dry weight of the calcium carbonate-comprising material. According to another embodiment the at least one calcium carbonate comprising material consists of calcium carbonate. According to a preferred embodiment the at least one calcium carbonate comprising material consists of calcium carbonate.

The at least one calcium carbonate-comprising material is preferably in the form of a particulate material. According to one embodiment of the present invention that the at least one calcium carbonate-comprising material has a weight median particle size $d_{50}$ value in the range from 0.1 to 7 μm. For example, the at least one calcium carbonate-comprising material has a weight median particle size $d_{50}$ from 0.25 μm to 5 μm and preferably from 0.7 μm to 4 μm.

According to one embodiment of the present invention the at least one calcium carbonate-comprising material may have a top cut ($d_{98}$) of ≤15 μm. For example, the at least one calcium carbonate-comprising material may have a top cut ($d_{98}$) of ≤12.5 μm, preferably of ≤10 μm and most preferably of ≤7.5 μm.

According to another embodiment of the present invention the specific surface area of the calcium carbonate-comprising material measured by BET nitrogen method according to ISO 9277:2010 is in the range from 1 to 250 $m^2/g$, preferably in the range from 2 to 200 $m^2/g$ and most preferably in the range from 3 to 150 $m^2/g$.

According to a preferred embodiment of the present invention the at least one calcium carbonate-comprising material is selected from the group consisting of ground calcium carbonate, preferably marble, limestone, dolomite and/or chalk, precipitated calcium carbonate, preferably vaterite, calcite and/or aragonite, surface-reacted calcium carbonate, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof.

Natural or ground calcium carbonate (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable form of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate comprising mineral material comprises a wet ground calcium carbonate comprising mineral material, the grinding step may be performed under conditions such that autogenous grinding takes place and/or by horizontal ball milling, and/or other such processes known to the skilled man. The wet processed ground calcium carbonate comprising mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural or ground calcium carbonate (GCC) is selected from marble, chalk, limestone, or mixtures thereof. Preferably, the source of ground calcium carbonate is marble, and more preferably dolomitic marble and/or magnesitic marble. According to one embodiment of the present invention the GCC is obtained by dry grinding. According to another embodiment of the present invention the GCC is obtained by wet grinding and subsequent drying.

"Dolomite" in the meaning of the present invention is a calcium carbonate comprising mineral, namely a carbonic calcium-magnesium-mineral, having the chemical composition of $CaMg(CO_3)_2$ ("$CaCO_3.MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment of the present invention, the calcium carbonate comprises one type of ground calcium carbonate. According to another embodiment of the present invention, the calcium carbonate comprises a mixture of two or more types of ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation by combining calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

According to one embodiment of the present invention, the calcium carbonate comprises one type of precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to a preferred embodiment of the present invention the at least one calcium carbonate-comprising material is ground calcium carbonate and/or precipitated calcium carbonate.

According to one embodiment of the present invention the at least one calcium carbonate-comprising material, preferably the ground calcium carbonate and/or the precipitated calcium carbonate has a content of calcium carbonate of at least 50 wt.-%, preferably 75 wt.-%, more preferably 90 wt.-%, and most preferably 95 wt.-%, based on the total dry weight of the calcium carbonate-comprising material. According to another embodiment the at least one calcium carbonate comprising material consists of calcium carbonate.

The at least one calcium carbonate-comprising material, preferably the ground calcium carbonate and/or the precipitated calcium carbonate, is preferably in the form of a particulate material. According to one embodiment of the present invention that the at least one calcium carbonate-comprising material, preferably the ground calcium carbonate and/or the precipitated calcium carbonate, has a weight median particle size $d_{50}$ value in the range from 0.1 to 7 µm. For example, the at least one calcium carbonate-comprising material has a weight median particle size $d_{50}$ from 0.25 µm to 5 µm and preferably from 0.7 µm to 4 µm.

According to one embodiment of the present invention the at least one calcium carbonate-comprising material, preferably the ground calcium carbonate and/or the precipitated calcium carbonate, may have a top cut ($d_{98}$) of ≤15 µm. For example, the at least one calcium carbonate-comprising material may have a top cut ($d_{98}$) of ≤12.5 µm, preferably of ≤10 µm and most preferably of ≤7.5 µm.

According to another embodiment of the present invention the specific surface area of the ground calcium carbonate and/or the precipitated calcium carbonate, measured by the BET nitrogen method according to ISO 9277:2010 is in the range from 1 and 100 $m^2/g$, preferably in the range from 2 to 60 $m^2/g$ and most preferably in the range from 3 to 8 $m^2/g$.

According to a preferred embodiment the at least one calcium carbonate-comprising material is a surface-reacted calcium carbonate.

The surface-reacted calcium carbonate in the meaning of the present invention is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

The natural and/or precipitated calcium carbonate may be used dry or suspended in water to prepare the surface-reacted calcium carbonate. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

An $H_3O^+$ ion donor in the context of the present invention is a Brønsted acid and/or an acid salt.

In a preferred embodiment of the invention the surface-reacted calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

Precipitated calcium carbonate may be ground prior to the treatment with carbon dioxide and at least one $H_3O^+$ ion donor by the same means as used for grinding natural calcium carbonate as described above.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 min. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilised in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilised calcium ions correspond to an excess of solubilised calcium ions relative to the solubilised calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilised calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilised calcium ions.

In a further preferred embodiment of the preparation of the surface-reacted natural or precipitated calcium carbonate, the natural or precipitated calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with an acid and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural or precipitated calcium carbonate in the form of granules or a powder.

The surface reacted calcium carbonate may have different particle shapes, such as e.g. the shape of roses, golf balls and/or brains.

In a preferred embodiment, the specific surface area of the surface-reacted calcium carbonate as measured by the BET nitrogen method according to ISO 9277:2010 is in the range from 1 to 250 m$^2$/g, preferably in the range from 2 to 200 m$^2$/g, and most preferably in the range from 35 to 150 m$^2$/g. For example, the surface-reacted calcium carbonate has a specific surface area of from 45 to 150 m$^2$/g, or from 75 to 140 m$^2$/g, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) and is specified in m$^2$/g.

It is furthermore preferred that the surface-reacted calcium carbonate particles have a volume median grain diameter $d_{50}$ (vol) of from 1 to 75 µm, preferably from 2 to 50 µm, more preferably 3 to 40 µm, even more preferably from 4 to 30 µm, and most preferably from 5 to 15 µm.

It may furthermore be preferred that the surface-reacted calcium carbonate particles have a grain diameter $d_{98}$ (vol) of from 2 to 150 µm, preferably from 4 to 100 µm, more preferably 6 to 80 µm, even more preferably from 8 to 60 µm, and most preferably from 10 to 30 µm.

The processes and instruments are known to the skilled person and are commonly used to determine grain size of fillers and pigments.

The specific pore volume is measured by mercury intrusion porosimetry using a Micromeritics Autopore V 9620 mercury porosimeter having a maximum applied pressure of mercury 414 MPa (60 000 psi), equivalent to a Laplace throat diameter of 0.004 µm (~nm). The equilibration time used at each pressure step is 20 s. The sample material is sealed in a 5 cm$^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-reacted calcium carbonate has an intra-particle intruded specific pore volume in the range from 0.1 to 2.3 cm$^3$/g, more preferably from 0.2 to 2.0 cm$^3$/g, especially preferably from 0.4 to 1.8 cm$^3$/g and most preferably from 0.6 to 1.6 cm$^3$/g, calculated from mercury porosimetry measurement.

The intra-particle pore size of the surface-reacted calcium carbonate preferably is in a range of from 0.004 to 1.6 µm, more preferably in a range of between 0.005 to 1.3 µm, especially preferably from 0.006 to 1.15 µm and most preferably of 0.007 to 1.0 µm, e.g. 0.01 to 0.9 µm determined by mercury porosimetry measurement.

The calcium carbonate-comprising material is provided in form of an aqueous suspension having a solids content in the range from 5 to 90 wt.-%, based on the total weight of the aqueous suspension. According to a preferred embodiment the solids content of the aqueous suspension is in the range from 10 to 70 wt.-%, more preferably in the range from 15 to 60 wt.-% and most preferably in the range from 18 to 40 wt.-%, based on the total weight of the aqueous suspension.

The aqueous suspension comprises water and the at least one calcium carbonate comprising material. Additionally, the aqueous suspension may comprise further solvents that are miscible with water. For example, the aqueous suspension may comprise organic solvents like ethanol, methanol, acetone, ethylene glycol, glycerine or propanol. According to a preferred embodiment the aqueous suspension consists of water and the at least one calcium carbonate comprising material.

Optionally, the aqueous calcium carbonate-comprising material comprises further additives.

In one preferred embodiment of the present invention, the aqueous calcium carbonate-comprising material comprises an additional dispersing agent, e.g. a polyacrylate. In another preferred embodiment of the present invention, the aqueous calcium carbonate-comprising material is free of additional dispersing agents, e.g. polyacrylate.

Characterisation of Step b): Adjusting the pH-Value of the Aqueous Suspension of Step a)

According to step b) of the process of the present invention the pH-value of the aqueous suspension of step a) is adjusted to a range from 7.5 to 12.

Another preferred option according to step b) of the process of the present invention is the addition of at least one base to the aqueous suspension of step a) for adjusting the pH-value to a range from 7.5 to 12. One option for adjusting the pH-value to the desired range is to use a basic starting material for manufacturing the at least one surface-modified calcium carbonate. Another option is to use a basic ground calcium carbonate or precipitated calcium carbonate.

The inventors surprisingly found that by adjusting the pH-value of the aqueous suspension of step a) to a range from 7.5 to 12, for example with a base, the surface-treatment agent according to present invention is bound stronger to the surface of the calcium carbonate-comprising material as without such a pH-adjustment and/or outside that pH-value.

The expression "at least one" base means that one or more, for example two or three bases may be added to the aqueous suspension of step a). According to a preferred embodiment only one base is added to the aqueous suspension of step a).

The at least one base is preferably selected from the group consisting of calcium hydroxide, magnesium hydroxide, calcium hydrogen carbonate, sodium hydroxide, potassium hydroxide, lithium hydroxide, ammonium hydroxide, primary, secondary and tertiary amines and mixtures thereof, more preferably is calcium hydroxide and/or ammonium hydroxide and most preferably is calcium hydroxide.

Primary, secondary or tertiary amines in the meaning of the present invention are derivatives of ammonia, wherein one or more hydrogen atoms have been replaced by a substituent such as an alkyl or aryl group.

The base may be used in "solid" form or as "liquid" or as "gas".

For example, calcium hydroxide, magnesium hydroxide, calcium hydrogen carbonate, sodium hydroxide, potassium hydroxide and lithium hydroxide are solid under standard ambient temperature and pressure (SATP) which refers to a temperature of 298.15 K (25° C.) and an absolute pressure of exactly 100 000 Pa (1 bar, 14.5 psi, 0.98692 atm). If the base is in solid form it can be added to the aqueous suspension of step a) for example as powder, tablet, granules, flakes etc.

However, the solid base may also be dissolved/dispersed/suspended in water and added as solution/dispersion/suspension to the aqueous suspension of step a), i.e. in a liquid form.

Ammonium hydroxide according to the present invention is a solution of ammonia ($NH_3$) in water and, therefore, ammonium hydroxide is used as liquid. Furthermore, several primary, secondary or tertiary amines, for example, propylamine, diethylamine and triethylamine are liquid under standard ambient temperature and pressure (SATP) which refers to a temperature of 298.15 K (25° C.) and an absolute pressure of exactly 100 000 Pa (1 bar, 14.5 psi, 0.98692 atm). If the base is in liquid form it can be added to the aqueous suspension of step a) for example as neat liquid or as solution wherein the liquid base is mixed with water.

Some primary, secondary or tertiary amines like, for example, methylamine, ethylamine, dimethylamine and triethylamine are gases under standard ambient temperature and pressure (SATP) which refers to a temperature of 298.15 K (25° C.) and an absolute pressure of exactly 100 000 Pa (1 bar, 14.5 psi, 0.98692 atm). If the base is a gas it may be bubbled through the aqueous suspension of step a).

According to an exemplified embodiment of the present invention the base is calcium hydroxide which is solid under standard ambient temperature and pressure (SATP) which refers to a temperature of 298.15 K (25° C.) and an absolute pressure of exactly 100 000 Pa (1 bar, 14.5 psi, 0.98692 atm). The calcium carbonate is added to the aqueous suspension of step a) as powder.

According to one embodiment of the present invention the pH-value is adjusted in process step b) to the range from 7.8 to 11.5 and more preferably to the range from 8 to 11.

The pH adjustment of the present invention can be measured with any pH meter that may be used for measuring the pH in suspension, for example, a Mettler Toledo Seven Easy pH meter with a Mettler Toledo InLab® Expert Pro pH electrode. The pH is measure at 25° C. and the pH is stable according to the present invention when there is no change in the pH value within ±0.2 units for 5 min.

The addition of the at least one base to the aqueous suspension of step a) can be accomplished by any conventional means known to the skilled person. Preferably, the addition may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany.

According to another embodiment of the present invention the aqueous suspension obtained from step b) is preheated, before addition step c) is carried out. That is to say, the aqueous suspension obtained in step b) comprising the base of step b) and the aqueous suspension of the at least one calcium carbonate-comprising material is preheated at a temperature of from 30 to 120° C., preferably of from 45 to 115° C., more preferably of from 50 to 105° C. and most preferably of from 70 to 100° C. before addition step c) is carried out. For example, the aqueous suspension obtained in step b) is heated to a temperature of 90° C.±5° C.

The treatment time for carrying out the preheating of the aqueous suspension obtained from step b) is carried out for a period of 30 min or less, preferably for a period of 20 min or less and more preferably for a period of 15 min or less. According to one embodiment of the present invention the aqueous suspension obtained from step b) is preheated at a temperature of from 30 to 120° C., preferably of from 45 to 115° C., more preferably of from 50 to 105° C. and most preferably of from 70 to 100° C. before addition step c) is carried out for a period of 30 min or less, preferably for a period of 20 min or less and more preferably for a period of 15 min or less.

In one embodiment of the present invention, the preheating of the aqueous suspension obtained from step b) is carried out at a temperature that is of about equal to the temperature implemented during mixing step d).

The term "equal" temperature in the meaning of the present invention refers to a preheating temperature that is at most 20° C., preferably at most 15° C., more preferably 10° C. and most preferably at most 5° C., below or above the temperature implemented during mixing step d).

The preheating of the aqueous suspension obtained from step b) takes place under mixing conditions. The skilled man will adapt these mixing conditions (such as the configuration of mixing pallets and mixing speed) according to his process equipment.

Characterisation of Step c): Addition of at Least One Surface-Treatment Agent

According to step c) of the present invention at least one surface-treatment agent is added to the aqueous suspension obtained in step b) in an amount ranging from 0.05 to 10 mg surface treatment agent per m² of the surface area of the at least one calcium carbonate-comprising material as provided in step a), wherein the at least one surface treatment agent is a compound according to Formula (I),

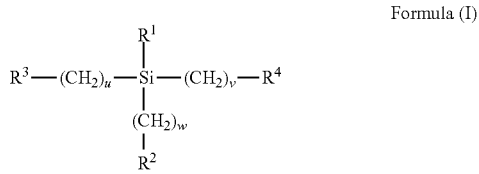

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group, and u, v and w are independently from each other an integer from 0 to 24.

The expression "at least one" surface-treatment agent means that one or more, for example two or three surface-treatment agents may be added to the aqueous suspension obtained in step b). According to a preferred embodiment of the present invention only one surface-treatment agent is added to the aqueous suspension obtained in step b).

The term "surface-treatment agent" according to the present invention is an agent that may be used to treat the surface of the at least one calcium carbonate-comprising material. The surface-treatment agent of the present invention is a silane agent that comprises at least one hydrolysable alkoxy group attached to the Si atom.

The "hydrolysable alkoxy group" attached to the Si atom according to the present invention hydrolyses readily with water to form a silanol Si—OH group. The alkoxy group according to the present invention is an alkyl group that is singular bonded to an oxygen atom. The oxygen atom according to the present invention is bonded to the Si atom of formula I. The alkyl group of the alkoxy group in the meaning of the present invention refers to a linear, saturated organic compound composed of carbon and hydrogen. According to a preferred embodiment the alkyl group of the alkoxy group is a linear alkyl group having a total amount of carbon atoms from C1 to C15, preferably from C1 to C8 and most preferably from C1 to C2. According to an exemplified embodiment of the present invention the hydrolysable alkoxy group is a methoxy or an ethoxy group.

According to the present invention $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group.

A hydroxyl group in the meaning of the present invention is one oxygen atom connected by a covalent bonding to one hydrogen atom (—OH group).

The term "alkyl" in the meaning of the present invention refers to a linear or branched, saturated organic compound composed of carbon and hydrogen having 1 to 28, preferably 8 to 26, more preferably 14 to 22, and most preferably 16 to 20 carbon atoms.

The vinyl group in the meaning of the present invention is the functional group —CH=$CH_2$ The acyloxy group according to the present invention is an acyl group that is singular bonded to an oxygen atom. The acyl group according to the present invention is an alkyl group that is attached to a CO group with a single bond. Therefore, the acyloxy group has the chemical formula —O(O)$CR^5$, wherein $R^5$ represents the alkyl group. The alkyl group of the acyloxy group in the meaning of the present invention refers to a linear or branched, saturated organic compound composed of carbon and hydrogen having a total amount of carbon atoms from C1 to C15, preferably from C1 to C8 and most preferably from C1 to C6.

According to the present invention the acryloxy group has the following formula II wherein $R^6$ is hydrogen, the methacryloxy group has the following formula II wherein $R^6$ is methyl and the ethacryloxy group has the following formula II wherein $R^6$ is ethyl.

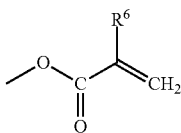

(Formula II)

The carboxyl group according to the present invention consists of a carbon atom that forms two chemical bonds to one oxygen atom and one chemical bond to a second oxygen atom. This second oxygen is also bonded to a hydrogen atom. The arrangement is written —C(O)OH.

The epoxy group according to the present invention consists of an oxygen atom joined by single bonds to two adjacent carbon atoms, thus forming the three-membered epoxide ring.

An anhydride group comprises two acyl groups bonded to one oxygen atom. According to the present invention the anhydride group has the chemical formula —C(O)OC(O)$R^7$, wherein $R^7$ represents an alkyl group. The alkyl group of the anhydride group in the meaning of the present invention refers to a linear or branched, saturated organic compound composed of carbon and hydrogen having a total amount of carbon atoms from C1 to C15, preferably from C1 to C8 and most preferably from C1 to C6. According to another embodiment the anhydride group is a cyclic anhydride group.

The ester group according to the present invention has the chemical formula —C(O)O$R^8$, wherein $R^8$ represents an alkyl group. The alkyl group of the ester group in the meaning of the present invention refers to a linear or branched, saturated organic compound composed of carbon and hydrogen having a total amount of carbon atoms from C1 to C15, preferably from C1 to C8 and most preferably from C1 to C6.

The aldehyde group in the meaning of the present invention is the functional group —C(O)H.

The amino group in the meaning of the present invention is the functional group —$NH_2$.

The ureido group in the meaning of the present invention is the functional group —NH—C(O)—$NH_2$.

The azide group in the meaning of the present invention is the functional group —$N_3$.

The halogen group in the meaning of the present invention comprises fluorine —F, chlorine —Cl, bromine —Br and iodine —I, preferably is chlorine —Cl and fluorine —F, and most preferably is fluorine —F.

The phosphonate group according to the present invention has the chemical formula —P(O)O$R^9$O$R^{10}$, wherein $R^9$ and $R^{10}$ are independently from each other selected from the group consisting of hydrogen or an alkyl group. The alkyl group of the phosphonate group in the meaning of the present invention refers to a linear or branched, saturated organic compound composed of carbon and hydrogen having a total amount of carbon atoms from C1 to C15, preferably from C1 to C8 and most preferably from C1 to C6.

The phosphine group according to the present invention has the chemical formula —P$R^{11}R^{12}$, wherein $R^{11}$ and $R^{12}$ are independently from each other selected from the group consisting of hydrogen or an alkyl group. The alkyl group of the phosphine group in the meaning of the present invention refers to a linear or branched, saturated organic compound composed of carbon and hydrogen having a total amount of carbon atoms from C1 to C15, preferably from C1 to C8 and most preferably from C1 to C6.

The sulphonate group in the meaning of the present invention is the functional group —S(O)(O)OH.

The sulphide group according to the present invention has the chemical formula —S$R^{13}$, wherein $R^{13}$ is an alkyl group. The alkyl group of the sulphide group in the meaning of the present invention refers to a linear or branched, saturated organic compound composed of carbon and hydrogen having a total amount of carbon atoms from C1 to C15, preferably from C1 to C8 and most preferably from C1 to C6.

The disulphide group according to the present invention has the chemical formula —SS$R^{14}$, wherein $R^{14}$ is a hydrogen or an alkyl group. The alkyl group of the disulphide group in the meaning of the present invention refers to a linear or branched, saturated organic compound composed of carbon and hydrogen having a total amount of carbon atoms from C1 to C15, preferably from C1 to C8 and most preferably from C1 to C6.

The isocyanate group in the meaning of the present invention is the functional group —NC(O). A masked isocyanate group according to the present invention refers to an isocyanate group that is masked or blocked by a masking agent. At temperatures of above 120° C. the masking agent will be split of the surface treatment agent and the isocyanate group will be obtained.

The thiol group in the meaning of the present invention is the functional group —SH.

The phenyl group or phenyl ring in the meaning of the present invention is a cyclic group with the formula —$C_6H_5$.

The benzyl group in the meaning of the present invention is the functional group —$CH_2C_6H_5$.

The styryl group in the meaning of the present invention is the functional group —CH=CH—$C_6H_5$.

The benzoyl group in the meaning of the present invention is the functional group —C(O)$C_6H_5$.

According to the present invention u, v and w are independently from each other an integer from 0 to 24. According to one embodiment u, v and w are the same and are an integer from 0 to 24, or from 2 to 20 or from 3 to 12. According to another embodiment u, v and w are different. For example, u is an integer from 0 to 24, v is an integer from 0 to 24 and w is an integer from 0 to 24. According to a preferred embodiment u and w are the same and v is a different integer. For example, u and w may be an integer from 0 to 24, or from 1 to 20 or from 2 to 18 or from 3 to 12 and v may be an integer from 0 to 24, or from 1 to 20, or from 2 to 18 or from 3 to 12. According to another preferred embodiment u and w may be 0 and v may be an integer from 0 to 24, or from 1 to 20, or from 2 to 18 or from 3 to 12. According to an exemplified embodiment v is 3.

According to the present invention $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group.

According to a preferred embodiment $R^1$ is a hydrolysable alkoxy group, and $R^2$ is an alkoxy group. According to a more preferred embodiment $R^1$ is a hydrolysable alkoxy group, and $R^2$ as well as $R^3$ are alkoxy groups. The alkoxy group of $R^2$ and/or $R^3$ may also be a hydrolysable alkoxy group. According to an even more preferred embodiment of the present invention $R^1$, $R^2$ and $R^3$ are the same hydrolysable alkoxy groups and most preferably are methoxy or ethoxy groups. In the foregoing embodiment $R^4$ is preferably independently from $R^1$, $R^2$ and $R^3$ selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group, and u, v and w are independently from each other an integer from 0 to 24. According to a preferred embodiment $R^4$ is selected from the group consisting of an alkyl group, a vinyl group and an amino group, u and w are 0 and v is an integer from 0 to 24.

According to one embodiment of the present invention the at least one surface treatment agent is a compound according to Formula (I), wherein $R^1$, $R^2$, $R^3$ and/or $R^4$ are independently from each other a methoxy or an ethoxy group. Additionally or alternatively, the at least one surface-treatment agent is selected from triethoxysilane and/or trimethoxysilane and preferably is selected from the group consisting of triethoxyvinylsilane, trimethoxyvinylsilane, 3-(2,3-epoxypropoxy)propyl-trimethoxysilane, triethoxysilylpropyltetrasulphide, 3-mercaptopropyltrimethoxysilane, 3-methacryloxypropyltrimethoxysilane, 3-aminopropyltriethoxysilane, methyltriethoxysilane, 3-glycidoxypropyltrimethoxysilane, dodecyltriethoxysilane, n-octadecyltriethoxysilane, phenyltriethoxysilane, 3-butenyltriethoxysilane and combinations thereof and most preferably is triethoxyvinylsilane and/or trimethoxyvinylsilane.

According to another embodiment of the present invention the at least one surface-treatment agent is a compound according to Formula (I), wherein $R^1$, $R^2$ and $R^3$ are a methoxy or an ethoxy group, $R^4$ is an alkyl group and u, v and w is 0. According to a preferred embodiment $R^4$ is a linear alkyl group having 1 to 28, preferably 8 to 26, more preferably 14 to 22, even more preferably 16 to 20 and most preferably 18 carbon atoms and u, v and w is 0. For example the surface-treatment agent is n-octadecyltriethoxysilane.

According to another embodiment of the present invention the at least one surface-treatment agent is a compound according to Formula (I), wherein $R^1$, $R^2$ and $R^3$ are a methoxy or an ethoxy group, $R^4$ is an amino group, u and w are 0 and v is an integer from 0 to 24. According to a preferred embodiment u and w are 0 and v is an integer from 1 to 20, preferably from 2 to 18 more preferably from 3 to 12 and most preferably is 3. For example the surface-treatment agent is (3-aminopropyl)triethoxysilane.

According to one embodiment of the present invention the amount of the at least one surface-treatment agent added in step c) is in the range from 0.07 to 9 mg surface-treatment agent per $m^2$ of the surface area of the calcium carbonate-comprising material, preferably in the range from 0.1 to 8 mg surface-treatment agent per $m^2$ of the surface area of the calcium carbonate-comprising material and most preferably in the range from 0.11 to 5 mg surface-treatment agent per $m^2$ of the surface area of the calcium carbonate-comprising material.

The step of adding the at least one surface-treatment agent, in one or more steps, to the aqueous suspension obtained in step b) preferably takes place under mixing conditions. The skilled man will adapt these mixing conditions (such as the configuration of mixing pallets and mixing speed) according to his process equipment.

In one embodiment of the present invention, the process may be a continuous process. In this case, it is possible to add the at least one surface-treatment agent to the aqueous suspension obtained in step b) in a constant flow such that a constant concentration of the at least one surface-treatment agent is provided during step c).

Alternatively, the at least one surface-treatment agent is added to the aqueous suspension obtained in step b) in one step, wherein said at least one surface-treatment agent is preferably added in one portion.

In another embodiment, the inventive process may be a batch process, i.e. the at least one surface-treatment agent is added to the aqueous suspension obtained in step b) in more than one step, wherein said at least one surface-treatment agent is preferably added in about equal portions. Alternatively, it is also possible to add the at least one surface-treatment in unequal portions to the aqueous suspension obtained in step b), i.e. in larger and smaller portions.

According to one embodiment of the present invention, step c) is carried out in a batch or continuous process for a period of time from 0.1 to 1 000 s. For example, step c) is a continuous process and comprises one or several contacting steps and the total contacting time is from 0.1 to 20 s, preferably from 0.5 to 15 s and most preferably from 1 to 10 s.

The surface-treatment agent may be used in "solid" form or as "liquid".

A "solid surface-treatment agent" is solid under standard ambient temperature and pressure (SATP) which refers to a temperature of 298.15 K (25° C.) and an absolute pressure of exactly 100 000 Pa (1 bar, 14.5 psi, 0.98692 atm). If the surface-treatment agent is in solid form it can be added to the aqueous suspension of step a) for example as powder, tablet, granules, flakes etc.

However, the solid surface-treatment agent may also be dissolved/dispersed in a solvent and added as solution/suspension to the aqueous suspension obtained in step b).

For example, trimethoxyvinylsilane is liquid under standard ambient temperature and pressure (SATP) which refers to a temperature of 298.15 K (25° C.) and an absolute pressure of exactly 100 000 Pa (1 bar, 14.5 psi, 0.98692 atm). If the surface-treatment agent is in liquid form it can be added to the aqueous suspension obtained in step b) for example as neat liquid or as solution wherein the liquid base is mixed with a solvent.

According to an exemplified embodiment of the present invention the surface-treatment agent is triethoxyvinylsilane, or n-octadecyltriethoxysilane or (3-aminopropyl)triethoxysilane) which are liquid under standard ambient temperature and pressure (SATP) which refers to a temperature of 298.15 K (25° C.) and an absolute pressure of exactly 100 000 Pa (1 bar, 14.5 psi, 0.98692 atm).

The solvent that may be used to dilute/dissolve/disperse the surface-treatment agent may be water and/or an organic solvent that is miscible with water, for example, an organic solvent like ethanol, methanol, acetone, ethylene glycol, glycerine or propanol. According to a preferred embodiment the solvent consists of water. According to another preferred embodiment the solvent is a mixture of water and at least one organic solvent that is miscible with water. Preferably, the solvent is a mixture consisting of water and ethanol and more preferably the water:ethanol mixture has a ratio from 2:1 to 1:2, based on the weight of the solvents and most preferably the water:ethanol mixture has a ratio of 1:1, based on the weight of the solvents.

According to one embodiment of the present invention the solids content of the diluted/dissolved/dispersed solution/suspension comprising the solvent and the at least one surface-treatment agent is in the range from 0.1 to 99.9 wt.-%, preferably in the range from 1 to 90 wt.-%, more preferably in the range from 2 to 60 wt.-%, and most preferably in the range from 3 to 50 wt.-%, based on the total weight of the suspension/solution. For example, the solids content of the diluted/dissolved/dispersed solution/suspension comprising the solvent and the at least one surface-treatment agent is about 5 wt.-%, based on the total weight of the suspension/solution.

According to another embodiment of the present invention the at least one surface-treatment agent or the diluted/dissolved/dispersed solution/suspension comprising the solvent and the at least one surface-treatment agent is preheated, before addition step c) is carried out. That is to say, the at least one surface-treatment agent or the diluted/dissolved/dispersed solution/suspension comprising the solvent and the at least one surface-treatment agent is treated at a temperature of from 30 to 120° C., preferably of from 45 to 115° C., more preferably of from 50 to 105° C. and most preferably of from 60 to 90° C. before addition step c) is carried out.

The treatment time for carrying out the preheating of the at least one surface-treatment agent or the diluted/dissolved/dispersed solution suspension comprising the solvent and the at least one surface-treatment agent is carried out for a period of 30 min or less, preferably for a period of 20 min or less and more preferably for a period of 15 min or less.

According to another embodiment of the present invention the at least one surface-treatment agent or the diluted/dissolved/dispersed solution/suspension comprising the solvent and the at least one surface-treatment agent is preheated at a temperature of from 30 to 120° C., preferably of from 45 to 115° C., more preferably of from 50 to 105° C. and most preferably of from 60 to 90° C. before addition step c) is carried out for a period of 30 min or less, preferably for a period of 20 min or less and more preferably for a period of 15 min or less.

In one embodiment of the present invention, the preheating of the at least one surface-treatment agent or the diluted/dissolved/dispersed solution/suspension comprising the solvent and the at least one surface-treatment agent is carried out at a temperature that is of about equal to the temperature implemented during mixing step d).

The term "equal" temperature in the meaning of the present invention refers to a preheating temperature that is at most 20° C., preferably at most 15° C., more preferably 10° C. and most preferably at most 5° C., below or above the temperature implemented during mixing step d).

The preheating of the at least one surface-treatment agent or the diluted/dissolved/dispersed solution/suspension comprising the solvent and the at least one surface-treatment agent preferably takes place under mixing conditions. The skilled man will adapt these mixing conditions (such as the configuration of mixing pallets and mixing speed) according to his process equipment.

According to a preferred embodiment of the present invention the at least one surface-treatment agent or the diluted/dissolved/dispersed solution/suspension comprising the solvent and the at least one surface-treatment agent may be treated with a base before the addition step c).

The term "base" according to the present invention refers to a base as defined by the Brønsted-Lowry theory. Therefore, a base in the meaning of the present invention is a substance that can accept hydrogen ions ($H^+$), otherwise known as protons.

The base may be selected from potassium hydroxide, lithium hydroxide, ammonium hydroxide and sodium hydroxide and preferably is sodium hydroxide.

The base may be used in "solid" form. For example, potassium hydroxide, lithium hydroxide, and sodium hydroxide are solid under standard ambient temperature and pressure (SATP) which refers to a temperature of 298.15 K (25° C.) and an absolute pressure of exactly 100 000 Pa (1 bar, 14.5 psi, 0.98692 atm). If the base is in solid form it can be added to the aqueous suspension of step a) for example as powder, tablet, granules, flakes etc.

However, the solid base may also be dissolved/dispersed in water and added as solution to the surface-treatment agent.

Ammonium hydroxide according to the present invention is a solution of ammonia ($NH_3$) in water and, therefore, ammonium hydroxide is used as liquid.

According to an exemplified embodiment of the present invention the base is sodium hydroxide which is solid under standard ambient temperature and pressure (SATP) which refers to a temperature of 298.15 K (25° C.) and an absolute pressure of exactly 100 000 Pa (1 bar, 14.5 psi, 0.98692 atm). The sodium hydroxide may be added to the surface-treatment agent as powder.

The addition of the at least one base to the surface-treatment agent can be accomplished by any conventional means known to the skilled person. Preferably, the addition may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time.

Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany.

The base may be added to the surface-treatment agent in the range of 0.1 to 80 wt.-%, preferably in the range of 1 to 40 wt.-%, more preferably in the range of 2- to 10 wt.-%, and most preferably in the range of 3 to 8 wt.-%, based on the dry weight of the surface-treatment agent.

Characterisation of Step d): Mixing of the Aqueous Suspension Obtained in Step c)

According to step d) of the present invention the aqueous suspension obtained in step c) is mixed at a temperature in the range from 30 to 120° C.

The mixing of the aqueous suspension obtained in step c) can be accomplished by any conventional means known to the skilled person. The skilled person will adapt the mixing conditions such as the mixing speed, dividing, and temperature according to his process equipment. Additionally, the mixing may be carried out under homogenizing and/or particle dividing conditions.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany.

It is required that in step d) the aqueous suspension obtained in step c) is mixed at a temperature in the range from 30 to 120° C. According to one embodiment of the present invention step d) is carried out at a temperature in the range from 45 to 115° C., preferably from 50 to 105° C. and more preferably in the range from 80 to 100° C. For example, the mixing step d) is carried out at a temperature of 90° C.±5° C. The advantage of such a temperature during mixing step d) is that the surface-treatment agent of the present invention is bound stronger to the surface of the calcium carbonate-comprising material as without such a temperature. Another advantage of such a temperature during mixing step d) is that the reaction might be faster and, therefore, shorter reaction times are needed.

According to another embodiment of the present invention step d) is carried out for at least 1 s, preferably for at least 1 min, e.g. for at least 10 min, 15 min, 30 min, 45 min or 60 min. According to a preferred embodiment step d) is carried out for a period of time ranging from 1 s to 60 min, preferably for a period of time ranging from 15 min to 45 min. For example, the mixing step d) is carried out for 30 min±5 min.

According to a preferred embodiment of the present invention step d) is carried out at a temperature in the range from 30 to 120° C. and/or for a period of time ranging from 1 s to 60 min. According to another preferred embodiment of the present invention step d) is carried out at a temperature in the range from 30 to 120° C. and for a period of time ranging from 1 s to 60 min. According to another preferred embodiment of the present invention step d) is carried out at a temperature in the range from 30 to 120° C. or alternatively for a period of time ranging from 1 s to 60 min.

According to a preferred embodiment of the present invention step d) is carried out at a temperature in the range from 45 to 115° C., preferably from 50 to 105° C. and more preferably in the range from 80 to 100° C., and/or for a period of time ranging from 1 s to 60 min. According to another preferred embodiment of the present invention step d) is carried out at a temperature in the range from 45 to 115° C., preferably from 50 to 105° C. and more preferably in the range from 80 to 100° C., and for a period of time ranging from 1 s to 60 min. According to another preferred embodiment of the present invention step d) is carried out at a temperature in the range from 45 to 115° C., preferably from 50 to 105° C. and more preferably in the range from 80 to 100° C., or alternatively for a period of time ranging from 1 s to 60 min.

According to another embodiment of the present invention mechanical dewatering, preferably by centrifugation or filtration, is carried out during step d), and/or the surface-treated calcium carbonate-comprising material is washed with water during and/or after step d). According to a preferred embodiment of the present invention mechanical dewatering, preferably by centrifugation or filtration, is carried out during step d), and the surface-treated calcium carbonate-comprising material is washed with water during and/or after step d). According to another preferred embodiment of the present invention mechanical dewatering, preferably by centrifugation or filtration, is carried out during step d), or alternatively the surface-treated calcium carbonate-comprising material is washed with water during and/or after step d).

Such mechanical dewatering may be undertaken by all the techniques and methods well known to the man skilled in the art for reducing the water content of an aqueous suspension. The mechanical dewatering is preferably carried out by centrifugation or by filtration, for example, in a vertical plate pressure filter, a tube press or a vacuum filter. Preferably, dewatering step is carried out under pressure.

Such washing may be undertaken by all the techniques and methods well known to the man skilled in the art for reducing the water content of an aqueous suspension. The washing, for example, may be carried out by rinsing the mechanical dewatered surface-treated calcium carbonate-comprising material with water. Optionally, the mechanical dewatered surface-treated calcium comprising material is rinsed with a mixture comprising water and a further organic solvent that is miscible with water, for example, an organic solvent like ethanol, methanol, acetone, ethylene glycol, glycerine or propanol. The surface-treated calcium carbonate-comprising material is washed with water during and/or after step d). According to one embodiment the surface-treated calcium carbonate-comprising material is washed with water during and after step d). Alternatively, the surface-treated calcium carbonate-comprising material is washed with water during step d) or the surface-treated calcium carbonate-comprising material is washed with water after step d).

Characterisation of Step e): Drying the Aqueous Suspension During or after Step d)

According to step e) of the present invention the aqueous suspension is dried during or after step d) at a temperature in the range from 40 to 160° C. at ambient or reduced pressure until the moisture content of the obtained surface-treated calcium carbonate-comprising material is in the range from 0.001 to 20 wt.-%, based on the total weight of the surface-treated calcium carbonate-comprising material.

According to a preferred embodiment of the present invention step e) is carried out at a temperature in the range from 50 to 155° C., preferably from 70 to 150° C. and more preferably from 80 to 145° C. For example, step e) is carried out at a temperature of 120° C.±5° C.

According to a preferred embodiment of the present invention step e) is carried out at a temperature in the range from 50 to 155° C., preferably from 70 to 150° C. and more preferably from 80 to 145° C. at ambient or reduced pressure. According to another preferred embodiment of the present invention step e) is carried out at a temperature in the range from 50 to 155° C., preferably from 70 to 150° C. and more preferably from 80 to 145° C. at ambient pressure.

According to one embodiment of the present invention the aqueous suspension is dried during or after step d) at a temperature in the range from 40 to 160° C. at ambient pressure until the moisture content of the obtained surface-treated calcium carbonate-comprising material is in the range from 0.001 to 20 wt.-%, based on the total weight of the surface-treated calcium carbonate-comprising material.

Alternatively, the aqueous suspension is dried during or after step d) at a temperature in the range from 40 to 160° C. at reduced pressure until the moisture content of the obtained surface-treated calcium carbonate-comprising material is in the range from 0.001 to 20 wt.-%, based on the total weight of the surface-treated calcium carbonate-comprising material.

The drying may be carried out at ambient pressure or at reduced pressure. The ambient pressure refers to a value of exactly 100 000 Pa (1 bar, 14.5 psi, 0.98692 atm). A reduced pressure according to the present invention is defined as any pressure that is below the ambient pressure. According to a preferred embodiment the drying is carried out at ambient pressure.

According to the present invention the aqueous suspension is dried during or after step d) until the moisture content of the obtained surface-treated calcium carbonate-comprising material is in the range from 0.001 to 20 wt.-%, based on the total weight of the surface-treated calcium carbonate-comprising material.

The "moisture content" is measured gravimetrically as the weight loss upon heating to 150° C.

According to a preferred embodiment of the present invention step e) is carried out until the moisture content of the obtained surface-treated calcium carbonate-comprising material is in the range from 0.005 to 15 wt.-%, preferably in the range from 0.01 to 10 wt.-% and more preferably from 0.05 to 5 wt.-%, based on the total weight of the surface-treated calcium carbonate-comprising material.

The inventors surprisingly found out that by the foregoing process it is possible to prepare surface-treated calcium carbonate-comprising materials having improved surface characteristics, especially a high hydrophobicity. Furthermore, by the process according to the present invention it is possible to provide surface-treated calcium carbonate-comprising material wherein the surface-treatment agent according to claim 1 is attached stronger to the calcium carbonate-comprising material compared to surface-treated calcium carbonate-comprising materials prepared by conventional processes.

Furthermore, the inventors found that the process according to the present invention can be performed in water and, therefore, organic solvents can be reduced or avoided in the inventive process. Furthermore, the process according to the present invention can be prepared by mixing the educts and, therefore intermediate steps may be avoided in the present process.

Further Process Steps

According to one embodiment of the present invention the process comprises a further step f) of adding at least one base to the aqueous suspension during or after step c) to readjust the pH-value to the range from 7.5 to 12, preferably from 8 to 11.5 and most preferably from 8.5 to 11 during or after step d).

The expression "at least one" base means that one or more, for example two or three bases may be added to the aqueous suspension during or after step c). According to a preferred embodiment of the present invention only one base is added to the aqueous suspension during or after step c).

According to one embodiment of the present invention the at least one base added in step f) is selected from the group consisting of lithium hydroxide, sodium hydroxide, potassium hydroxide, calcium hydroxide, magnesium hydroxide and mixtures thereof.

The base may be used in "solid" form or as "liquid". For example, lithium hydroxide, sodium hydroxide, potassium hydroxide, calcium hydroxide and magnesium hydroxide are solid under standard ambient temperature and pressure (SATP) which refers to a temperature of 298.15 K (25° C.) and an absolute pressure of exactly 100 000 Pa (1 bar, 14.5 psi, 0.98692 atm). If the base is in solid form it can be added in step f) for example as powder, tablet, granules, flakes etc. However, the solid base may also be dissolved/dispersed in water and added as solution/suspension to the aqueous suspension during or after step c).

If step f) is present in the inventive process at least one base is added to the aqueous suspension during or after step c) to readjust the pH-value to the range from 7.5 to 12, preferably from 8 to 11.5 and most preferably from 8.5 to 11 during or after step d).

The pH adjustment of the present invention can be measured with any pH meter that may be used for measuring the pH in suspension, for example, a Mettler Toledo Seven Easy pH meter with a Mettler Toledo InLab® Expert Pro pH electrode. The pH is measure at 25° C. and the pH is stable according to the present invention when there is no change in the pH value within ±0.2 units for 5 min.

The addition of the at least one base in step f) can be accomplished by any conventional means known to the skilled person. Preferably, the addition may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany.

According to one embodiment of the present invention the process comprises a further step g) after or during step e) of deagglomerating the surface-treated calcium carbonate-comprising material of step d) or e), and preferably step g) is carried out during step e). According to another embodiment of the present invention the process comprises a further step g) after step e) of deagglomerating the surface-treated calcium carbonate-comprising material of step d) or e). According to a preferred embodiment of the present invention the process comprises a further step g) during step e) of deagglomerating the surface-treated calcium carbonate-comprising material of step d) or e).

The term "deagglomerating" in the meaning of the present invention refers to the breaking up of agglomerates which may have formed during the dewatering step and/or the drying step.

The deagglomerating may be carried out by any process known to the skilled man that is suitable for deagglomeration. For example, the deagglomeration step may be a dry grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man.

According to one embodiment of the present invention the process comprises a further step h) after or during step a), b), c), d), e) or f) of hydrophobizing the calcium carbonate of step a) or the surface-treated calcium carbonate-comprising material obtained from step d), e) or f) with a hydrophobizing agent different from the surface-treatment agent added in step c) and preferably step h) is carried out after step d) or during step e).

The hydrophobizing agent used in treatment step h) may be any agent known to the skilled person which is capable to form a hydrophobic treatment layer on at least a part of the surface area of the calcium carbonate-comprising material.

It is preferred to carry out step h) when step c) is carried out exclusively with surface-treatment agents which are not able to confer hydrophobic properties to the calcium carbonate-comprising material.

Suitable hydrophobizing agents are selected from the group consisting of phosphoric acid ester blends of one or more phosphoric acid mono-ester and salty reaction products thereof and/or one or more phosphoric acid di-ester and salty reaction products thereof; saturated aliphatic linear or branched carboxylic acids and salty reaction products thereof; aromatic carboxylic acids and salty reaction products thereof; polydialkylsiloxanes; mono-substituted succinic anhydrides and/or at least one mono-substituted succinic acid and/or salty reaction products thereof; aliphatic aldehydes and/or salty reaction products thereof; and mixtures thereof.

The process step h) with at least one mono-substituted succinic anhydride and/or with at least one phosphoric acid ester blend and suitable compounds for coating is described in EP 2 722 368 A1 and EP 2 770 017 A1.

The process step h) with at least one aliphatic aldehyde is described in EP 2 576 703 A1.

The process h) with at least one polydialkylsiloxane is described in US 2004/0097616 A1 which is thus incorporated herewith by reference. Most preferred are polydialkylsiloxanes selected from the group consisting of polydimethylsiloxane, preferably dimethicone, polydiethylsiloxane and polymethylphenylsiloxane and/or mixtures thereof. For example, the at least one polydialkylsiloxane is preferably a polydimethylsiloxane (PDMS).

Suitable aliphatic carboxylic acids for step h) are for example aliphatic linear or branched carboxylic acids having between 4 and 24 carbon atoms.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterised in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosanoic acid, behenic acid, tricosanoic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

In one preferred embodiment of the present invention, the inventive process may be a continuous process. In this case, it is possible to contact the aqueous suspension of the at least one calcium carbonate-comprising material of step a) with the at least one pH-adjusting agent, for example, a base of step b) and the at least one surface-treatment agent of step c) in a constant flow, so that a constant concentration of the at least one calcium carbonate-comprising material of step a) the at least one pH-adjusting agent, for example the base of step b), and the at least one surface-treatment agent of step c) is provided.

Alternatively, the aqueous suspension of the at least one calcium carbonate-comprising material of step a) is contacted with the at least one pH-adjusting agent, for example, a base of step b) and the at least one surface-treatment agent of step c) in one step, wherein said at least one surface-treatment agent is preferably added in one portion.

In another embodiment of the present invention, the inventive process may be a batch process, i.e. the aqueous suspension of the at least one calcium carbonate-comprising material of step a) is contacted with the at least one pH-adjusting agent, for example, a base of step b) and the at least one surface-treatment agent of step c) in more than one steps, wherein said surface-treatment agent is preferably added in about equal portions. Alternatively, it is also possible to add the at least one surface-treatment agent in unequal portions to the aqueous suspension obtained in step b), i.e. in larger and smaller portions.

According to one embodiment of the present invention all process steps are fully or partially batch or continuous processes, wherein a batch process is preferred for steps a) to d) and f) and g) and a continuous process is preferred for step e).

Surface-Treated Calcium Carbonate-Comprising Material

According to one aspect of the present invention, a surface-treated calcium carbonate-comprising material obtainable by a process according to the present invention is provided.

According to another embodiment of the present invention a surface-treated calcium carbonate-comprising material is obtained by a process comprising the following steps:
 a) providing an aqueous suspension of at least one calcium carbonate-comprising material having a solids content in the range from 5 to 90 wt.-%, based on the total weight of the aqueous suspension,
 b) adjusting the pH-value of the aqueous suspension of step a) to a range from 7.5 to 12, c) adding at least one surface-treatment agent to the aqueous suspension obtained in step b) in an amount ranging from 0.05 to 10 mg surface treatment agent per m² of the surface area of the at least one calcium carbonate-comprising material as provided in step a), wherein the at least one surface treatment agent is a compound according to Formula (I),

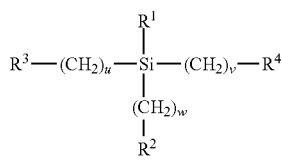

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group, and u, v and w are independently from each other an integer from 0 to 24, d) mixing the aqueous suspension obtained in step c) at a temperature in the range from 30 to 120° C., and e) drying the aqueous suspension during or after step d) at a temperature in the range from 40 to 160° C. at ambient or reduced pressure until the moisture content of the obtained surface-treated calcium carbonate-comprising material is in the range from 0.001 to 20 wt.-%, based on the total weight of the surface-treated calcium carbonate comprising material.

The surface-treated calcium carbonate comprising material according to the present invention comprises at least one calcium carbonate-comprising material and at least one surface-treatment agent, wherein the at least one surface treatment agent is a compound according to Formula (I),

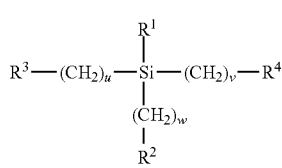

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group, and u, v and w are independently from each other an integer from 0 to 24, that is located on the surface of the calcium carbonate-comprising material, wherein the hydrolysable alkoxy groups of the surface-treatment agent have undergone a chemical reaction with molecules that are located on the surface of the calcium carbonate-comprising material. Additionally or alternatively, reaction products of the surface-treatment agent with the water, the pH-adjusting agent, for example, a base and/or the calcium carbonate-comprising material are located on the surface of the surface-treated calcium carbonate comprising material.

For example, by using the inventive process, it is possible to prepare surface-treated calcium carbonate-comprising materials having improved surface characteristics, like a high hydrophobicity or the ability to react with surrounding materials.

According to one embodiment of the present invention the surface-treated calcium carbonate-comprising material obtained by the process according to the present invention has a hydrophobicity of below 1.7:1 volumetric ratio of water:ethanol measured at +23° C. (±2° C.) with the sedimentation method. For example, the surface-treated calcium carbonate-comprising material obtained by the process according to the present invention has a hydrophobicity of below 1.5:1, preferably of below 1.4:1 and most preferably of below 1.3:1 volumetric ratio of water:ethanol measured at +23° C. (±2° C.) with the sedimentation method. For example the surface-treated calcium carbonate-comprising material obtained by the process according to the present invention has a hydrophobicity of 1:1 volumetric ratio of water:ethanol measured at +23° C. (±2° C.) with the sedimentation method.

Furthermore, the surface-treated calcium carbonate-comprising materials of the present invention comprise an increased amount of a surface-treatment agent on the surface area of the calcium carbonate-comprising material. Additionally, the inventors surprisingly found that the surface-treatment agent is attached stronger to the surface-treated calcium carbonate-comprising materials of the present invention compared to surface-treated calcium carbonate-comprising materials prepared by conventional processes.

Use of the Surface-Treated Calcium Carbonate-Comprising Material

According to the present invention the use of the surface-treated calcium carbonate-comprising material in a synthetic or bio sourced polymer composition, in paper making, paper coatings, agricultural applications, paints, adhesives, sealants, composite materials, wood composite materials, construction applications, pharma applications and/or cosmetic applications is provided.

According to another embodiment of the present invention the surface-treated calcium carbonate-comprising material of the present invention is used in a surrounding material, wherein the surface treatment agent of the surface-treated calcium carbonate-comprising material is undergoing a reaction with the surrounding material.

The term "surrounding material" in the meaning of the present invention refers to a matrix material that comprises the surface-treated calcium carbonate-comprising material as filler.

As already set out above the inventors surprisingly found that the surface-treatment agent is attached stronger to the surface-treated calcium carbonate-comprising materials of the present invention compared to surface-treated calcium carbonate-comprising materials prepared by conventional processes.

If the surface-treated calcium carbonate-comprising materials of the present invention are used in a final application product such as a synthetic or bio sourced polymer composition, in paper making, paper coatings, agricultural applications, paints, adhesives, sealants, composite materials, wood composite materials, construction applications, pharma applications and/or cosmetic applications or is used in a surrounding material, this will lead to an improved quality of the product compared to the same product wherein a surface-treated calcium carbonate-comprising materials prepared by conventional processes is used. Due to the stronger attachment of the surface-treatment agent on the surface of the calcium carbonate-comprising material the surface-treatment agent may not detach from the calcium carbonate-comprising material. This is desirably since detached surface-treatment agent may be present as "free" surface-treatment agent in the product and may have a negative impact on such a product. Furthermore, if the surface-treated calcium carbonate-comprising material is used in a surrounding or matrix material, for example, a synthetic or bio sourced polymer formulation, the connection of the surface-treated calcium carbonate-comprising material with the matrix may be negatively affected if the surface-treatment agent detaches from the surface-treated calcium carbonate-comprising material.

According to one embodiment of the present invention the surrounding material is a synthetic or bio sourced polymer formulation, preferably a polyolefin formulation, a polyvinylchloride formulation or a polyester formulation and the reaction is a crosslinking reaction.

A polyolefin formulation according to the present invention is any of a class of polymers produced from a simple olefin (also called an alkene with the general formula $C_nH_{2n}$) as a monomer. For example, polyethylene is the polyolefin produced by polymerizing the olefin ethylene. Polypropylene is another common polyolefin which is made from the olefin propylene.

A polyvinylchloride (PVC) formulation according to the present invention is a formulation comprising polymers having the following formula $—(CH_2—CHCl)_n—$.

A polyester formulation according to the present invention refers to polymers that contain an ester functional group in their main chain.

A "crosslinking reaction" according to the present invention is defined as a reaction between the surrounding material and the surface-treatment agent that is located on the surface of the surface-treated calcium carbonate-comprising material. Due to this reaction a bond is created between the surrounding material and the surface-treatment agent that is located on the surface of the surface-treated calcium carbonate-comprising material, wherein the bond is a chemical bond or an ionic bond.

The scope and interest of the present invention will be better understood based on the following examples which are intended to illustrate certain embodiments of the present invention and are non-limitative.

EXAMPLES

1 Measurement Methods

In the following the measurement methods implemented in the examples are described.

Moisture Pick Up Susceptibility

The moisture pick up susceptibility of a material as referred to herein is determined in mg moisture/g after exposure to an atmosphere of 10 and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10 and 85% relative humidity is then used to calculate the moisture pick-up in mg moisture/g of sample.

The moisture pick up susceptibility in mg/g divided by the specific surface area in $m^2/g$ (calculated based on the specific surface area BET) corresponds to the "normalized moisture pick up susceptibility" expressed in $mg/m^2$ of sample.

Volatile Onset Temperature

The "volatile onset temperature" has been determined by analysis of the thermogravimetric analysis (TGA) curve. TGA analysis described hereafter—begin to evolve, as observed on a TGA curve, plotting the mass of remaining sample (y-axis) as a function of temperature (x-axis), the preparation and interpretation of such a curve being defined hereafter. TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. TGA is performed using a Mettler Toledo TGA 851 based on a sample of 500±50 mg and scanning temperatures from 25 to 550° C. at a rate of 20° C./min under an air flow of 70 ml/min.

The skilled man will be able to determine the "volatile onset temperature" by analysis of the TGA curve as follows: the first derivative of the TGA curve is obtained and the inflection points thereon between 150 and 350° C. are identified. Of the inflection points having a tangential slope value of greater than 45° relative to a horizontal line, the one having the lowest associated temperature above 150° C. is identified. The temperature value associated with this lowest temperature inflection point of the first derivative curve is the "volatile onset temperature".

Humidity of Calcium Carbonate

A 10 g powder sample has been heated in an oven at 150° C. until the mass is constant for 20 min. The mass loss has been determined gravimetrically and is expressed as wt.-% loss based on the initial sample mass. This mass loss has been attributed to the sample humidity.

Hydrophobicity

Various mixtures of different water and ethanol have been prepared. The reported data are based on volume/volume ratios (volume water/volume ethanol). The different steps are listed hereafter:

a) A 100 ml glass beaker has been filled with 50 ml of a water/ethanol mixture.
b) Through a sieve (mesh size: approximately 1 mm) 0.5 g of the coated mineral material has been added on the top of the liquid surface.
c) After 30 s the amount of material which sank to the bottom of the beaker was identified (visual estimation).

The procedure has been repeated with different water/ethanol blends until the composition has been identified where approximately 50 wt.-% of the material sinks to the bottom of the beaker.

pH

The pH of a suspension is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 s).

Solids Content

The solids content (also known as "dry weight") was determined using a Moisture Analyser HR73 from the company Mettler-Toledo, Switzerland, with the following settings: temperature of 120° C., automatic switch off 3, standard drying, 5 to 20 g of product.

Specific Surface Area BET

The specific surface area is measured via the BET method according to ISO 9277:2010 using nitrogen, following conditioning of the sample by heating at 250° C. for a period of 30 min. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached. The specific surface area is measured before any surface treatment. We assume that the surface treatment does not alter the BET surface area.

Particle Size Distribution (Mass % Particles with a Diameter<X) and Weight Median Diameter ($d_{50}$) of a Particulate Material Weight median grain diameter and grain diameter mass distribution of a particulate material were determined via the sedimentation process, i.e. an analysis of sedimentation behaviour in a gravitational field. The measurement was made with a Sedigraph™ 5100.

The volume-based median particle diameter of the surface-reacted calcium carbonate was determined by using a Malvern Mastersizer 2000.

The processes and instruments are known to the skilled person and are commonly used to determine grain size of fillers and pigments. The measurements were carried out in an aqueous solution of 0.1 wt.-% $Na_4P_2O_7$. The samples were dispersed using a high speed stirrer and ultrasound.

Intra-Particle Intruded Specific Pore Volume

The intra-particle intruded specific pore volume has been calculated from a mercury intrusion porosimetry measurement using a Micromeritics Autopore IV 9500 mercury porosimeter having a maximum applied pressure of mercury 414 MPa (60 000 psi), equivalent to a Laplace throat diameter of 0.004 µm (~nm). The equilibration time used at each pressure step is 20 s. The sample material is sealed in a 5 cm³ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intraparticle pores, then this region appears bi modal. The sum of these three regions gives the total overall pore volume of the powder, but depends strongly on the original sample compaction/settling of the powder at the coarse pore end of the distribution. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

XRF Method

Tablets were produced by fusing the surface-treated calcium carbonate-comprising mineral and lithium tetraborate ($Li_2B_4O_7$).

The elemental composition of the sample tablets was measured by sequential, wavelength dispersive X-ray fluorescence.

2 Starting Materials 2.1 Surface Treatment Agents

TABLE 1

Surface treatment agents.

| Surface treatment agent number | Name | Supplier | Properties |
|---|---|---|---|
| (1) | Triethoxyvinylsilane (CAS: 78-08-0) | Aldrich order number 175560 | Purity 97% Refractive Index: 1.3960 Flash Point: 44° C. |
| (2) | n-Octadecyltriethoxysilane (CAS: 7399-00-0) | Gelest order number SIO6642.0 | Purity >95% Refractive Index: 1.4386 Melting Point: 10-12° C. Flash Point: <150° C. |

TABLE 1-continued

Surface treatment agents.

| Surface treatment agent number | Name | Supplier | Properties |
|---|---|---|---|
| (3) | (3-Aminopropyl)triethoxy-silane (CAS: 919-30-2) | Aldrich order number A3648 | Purity >98% Refractive Index: 1.4225 Flash Point: 104° C. |
| (4) | Phenyltriethoxysilane (CAS: 780-69-8) | Gelest order number SIP6821.0 | Purity >95% Refractive Index: 1.4718 Flash Point: 96° C. |
| (5) | 5,6-Epoxyhexyltriethoxysilane (CAS: 86138-01-4) | Gelest order number SIE4675.0 | Purity >97% Refractive Index: 1.4254 Flash Point: 99° C. |
| (6) | Hydroxymethyltriethoxysilane (CAS: 162781-70-6) | Gelest order number SIH6175.0 | Purity >50% Boiling Point: 76° C. - initial (ethanol) Flash Point: 15° C. |
| (7) | [Hydroxy(polyethyleneoxy)propyl]triethoxysilane (8-12 EO) (CAS: not found) | Gelest order number SIH6188.0 | Purity >50% Refractive Index: 1.401 Boiling Point: 76° C. - initial (ethanol) Flash Point: 12° C. |
| (8) | (Heptadecafluoro-1,1,2,2,-tetrahydrodecyl)triethoxysilane (CAS: 101947-16-4) | Gelest order number SIH5841.2 | Purity >95% Refractive Index: 1.3419 Flash Point: >85° C. |

Hydrolysis of the Treatment Agent:

The surface treatment agent was diluted with an ethanol/water (1/1, wt.-%/wt.-%) blend to a concentration of 5 wt.-% and heated under stirring to 70-80° C. Under continuous stirring the heated emulsion was treated with 5 wt.-% solid sodium hydroxide (quantity dry sodium hydroxide based on the quantity of surface treatment agent) and stirred for approximately 5 min. The hot emulsion was then used directly for the surface treatment trial.

2.2 Mineral Pigments

TABLE 2

Mineral pigments.

| Sample | Chemical nature | Intra-particle intruded specific pore volume (cm$^3$/g)$^a$ | BET surface [mg/m$^2$] | $d_{50}$ [μm] | Humidity [wt.-%] |
|---|---|---|---|---|---|
| A | Surface-reacted calcium carbonate | 0.864 | 139 | 4.53 | 6.77 |
| B | Ground calcium carbonate (marble) | — | 3.3 | 1.7 | 0.03 |

$^a$for the pore diameter range of 0.004 to 0.23 μm.

3 Experiments

Example 1 (Comparative)

400 g of surface-reacted calcium carbonate A was mixed for 10 min at 1 000 rpm and 120° C. in the Somakon mixer (Somakon Verfahrenstechnik UG; Germany). 2 wt.-% of surface treatment agent 1 was added and the blend was mixed for further 10 min at 120° C. and 1 000 rpm. After cooling down to room temperature the sample was removed from the mixer and stored in a sealed container.

As measured by XRF 93 wt.-% of surface treatment agent 1 was immobilised on the surface.

The treated sample was further washed by diluting with a mixture of ethanol/water (1/1, wt.-%/wt.-%) to a solids content of 20 wt.-% and heating it up to 80° C. The hot suspension was filtered and rinsed once with 100 ml of the fresh ethanol/water mixture. The washed sample was dried at 120° C. for 7 hours.

Subsequent XRF analysis revealed that only 33 wt.-% of the treatment agent was remaining on the sample surface. This means, the surface treatment agent is only insufficiently attached to the carbonate surface.

Example 2 (Inventive)

8.0 g of surface treatment agent number 3 is diluted with an ethanol/water (1/1, wt.-%/wt.-%) blend to a concentration of 5 wt.-% and heated under stirring to 70-80° C. Under continuous stirring the heated emulsion is treated with 5 wt.-% solid sodium hydroxide (quantity dry sodium hydroxide based on the quantity of surface treatment agent) and stirred for approximately 5 min.

400 g of surface-reacted calcium carbonate A was mixed with 1 600 g deionized water in order to obtain a suspension of approximately 20 wt.-%. The suspension was stirred with a VISCO JET CRACK of 12 cm diameter (300 to 500 rpm; VISCO JET Rührsysteme GmbH, Germany) at room temperature. The pH was adjusted with calcium hydroxide (solid powder) to a value of 10.5. The pH adjustment was stopped when the pH was stable within ±0.2 units for 5 min, the reported pH values are the end values.

The suspension was heated to 90° C. (±5° C.) under constant stirring. The hot emulsion of the treatment additive was added over a period of approximately 1 min. The blend was further stirred for 30 min at 90° C. The suspension was dried in an oven for 10 hours at 120° C. to a moisture content of below 1 wt.-%. The resulting dry crumbles were de-agglomerated in an IKA A 11 basic analytical mill for 1 min and stored afterwards in a sealed container.

As measured by XRF 80 wt.-% of surface treatment agent 3 was immobilised on the mineral surface.

The treated sample was further washed by diluting with a mixture of ethanol/water (1/1, wt.-%/wt.-%) to a solids content of 20 wt.-% and heated to 80° C. The hot suspension was filtered and rinsed once with 100 ml of the fresh ethanol/water mixture. The washed sample was dried at 120° C. for 7 hours.

Subsequent XRF analysis revealed that 85 wt.-% of the treatment agent was remaining on the sample surface. The treatment agent is well attached to the carbonate surface.

Example 3 (Comparative)

400 g of surface-reacted calcium carbonate A was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (solid powder) to a value of 10.5. The pH adjustment was stopped when the pH was stable within ±0.2 units for 5 min, the reported pH values are the end values.

The suspension was heated to 90° C. (±5° C.) under constant stirring. 4 wt.-% of surface treatment agent 2 was added over a period of approximately 1 min. The blend was further stirred for 30 min at 90° C. The suspension was dried in an oven for 10 h at 120° C. to a moisture content of below 1 wt.-%. The resulting dry crumbles were deagglomerated in an IKA A 11 basic analytical mill for 1 min and stored afterwards in a sealed container.

Hydrophobicity measurements of the dried powder showed that in a water/ethanol blend of 90/10 volume %/volume % 50 wt.-% of the material sank down to the bottom.

Example 4 (Inventive)

16.0 g of the surface treatment agent number 2 was diluted with an ethanol/water (1/1, wt.-%/wt.-%) blend to a concentration of 5 wt.-% and heated under stirring to 70-80° C. Under continuous stirring the heated emulsion is treated with 5 wt.-% solid sodium hydroxide (quantity dry sodium hydroxide based on the quantity of surface treatment agent) and stirred for approximately 5 min.

400 g of surface-reacted calcium carbonate A was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (solid powder) to a value of 10.5. The pH adjustment was stopped when the pH was stable within ±0.2 units for 5 min, the reported pH values are the end values.

The suspension was heated to 90° C. (±5° C.) under constant stirring. The hydrolysed surface treatment agent 2 was added over a period of approximately 1 min. The blend was further stirred for 30 min at 90° C. The suspension was dried in an oven for 10 hours at 120° C. to a moisture content of below 1 wt.-%. The resulting dry crumbles were de-agglomerated in an IKA A 11 basic analytical mill for 1 min and stored afterwards in a sealed container.

Hydrophobicity measurements of the dried powder showed that in a water ethanol blend of 55/45 volume %/volume % 50 wt.-% of the material sank down to the bottom.

Example 5 (Inventive)

2.0 g of surface treatment agent number 2 is diluted with an ethanol/water (1/1, wt.-%/wt.-%) blend to a concentration of 5 wt.-% and heated under stirring to 70-80° C. Under continuous stirring the heated emulsion is treated with 5 wt.-% solid sodium hydroxide (quantity dry sodium hydroxide based on the quantity of surface treatment agent) and stirred for approximately 5 min.

400 g of ground calcium carbonate B was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (solid powder) to a value of 10.5. The pH adjustment was stopped when the pH was stable within ±0.2 units for 5 min, the reported pH values are the end values.

The suspension was heated to 90° C. (±5° C.) under constant stirring. Hydrolysed surface treatment agent 2 was added over a period of approximately 1 min. The blend was further stirred for 30 min at 90° C. The suspension was dried in an oven for 10 hours at 120° C. to a moisture content of below 1 wt.-%. The resulting dry crumbles were de-agglomerated in an IKA A 11 basic analytical mill for 1 min and stored afterwards in a sealed container.

Hydrophobicity measurements of the dried powder showed that in a water ethanol blend of 55/45 volume %/volume % 50 wt.-% of the material sank down to the bottom. The water pick-up was 3.8 mg/g.

The treated sample was further washed mixed with an ethanol/water (1/1, wt. %/wt.-%) to a solids content of 20 wt.-% and heating it up to 80° C. The hot suspension was filtered and rinsed once with fresh ethanol/water. The washed sample was dried at 120° C. for 7 hours.

After the washing step, the water pick-up was 0.8 mg/g. In a 65/35 water/ethanol blend (volume %/volume %) 50 wt.-% of the material sank down.

Example 6 (Inventive)

4.0 g of the surface treatment agent number 2 is diluted with an ethanol/water (1/1, wt.-/wt.-%) blend to a concentration of 5 wt.-% and heated under stirring to 70-80° C. Under continuous stirring the heated emulsion is treated with 5 wt.-% solid sodium hydroxide (quantity dry sodium hydroxide based on the quantity of surface treatment agent) and stirred for approximately 5 min.

400 g of ground calcium carbonate B was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (solid powder) to a value of 10.5. The pH adjustment was stopped when the pH was stable within ±0.2 units for 5 min, the reported pH values are the end values.

The suspension was heated to 90° C. (±5° C.) under constant stirring. Hydrolysed surface treatment agent 2 was added over a period of approximately 1 min. The blend was further stirred for 30 min at 90° C. The suspension was dried in an oven for 10 hours at 120° C. to a moisture content of below 1 wt.-%. The resulting dry crumbles were de-agglomerated in an IKA A 11 basic analytical mill for 1 min and stored afterwards in a sealed container.

Hydrophobicity measurements of the dried powder showed that in a water ethanol blend of 50/50 volume %/volume % 50 wt.-% of the material sank down to the bottom. The water pick-up was 2.8 mg/g.

The treated sample was further washed mixed with an ethanol/water (1/1, wt.-%/wt.-%) blend to a solids content of 20 wt.-% and heating it up to 80° C. The hot suspension was filtered and rinsed once with fresh ethanol/water. The washed sample was dried at 120° C. for 7 hours.

After the washing step, the water pick-up was 0.5 mg/g. In a 50/50 water/ethanol blend (volume-%/volume-%) 50 wt.-% of the material sank down.

Example 7 (Comparative)

400 g of ground calcium carbonate B was mixed for 10 min at 1 000 rpm and 120° C. in the Somakon mixer (Somakon Verfahrenstechnik UG; Germany). 2 wt.-% of the surface treatment agent 2 was added and the blend was mixed for further 10 min at 120° C. and 1 000 rpm. After cooling down to room temperature the sample was removed from the mixer and stored in a sealed container.

Hydrophobicity measurements of the dried powder showed that 50 wt.-% of the material sank down to the bottom in a water ethanol blend of 65/35 volume %/volume %.

Example 8 (Inventive)

16.0 g of the surface treatment agent number 4 was diluted with an ethanol/water (1/1, wt.-%/wt.-%) blend to a concentration of 5 wt.-% and heated under stirring to 70-80° C. Under continuous stirring the heated emulsion is treated with 2.5 wt.-% solid potassium hydroxide (quantity dry potassium hydroxide based on the quantity of surface 4 treatment agent) and stirred for approximately 5 min.

400 g of dry ground calcium carbonate B was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature.

The suspension was heated to 90° C. (±5° C.) under constant stirring. 2 wt.-% of hydrolized surface treatment agent 4 was added over a period of approximately 1 min. The blend was further stirred for 30 min at 90° C. The suspension was dried in an oven for 10 h at 120° C. to a moisture content of below 1 wt.-%. The resulting dry crumbles were deagglomerated in an IKA A 11 basic analytical mill for 1 min and stored afterwards in a sealed container.

The treated sample was further washed mixed with an ethanol/water (1/1, wt.-%/wt.-%) blend to a solids content of 20 wt.-% and heating it up to 80° C. The hot suspension was filtered and rinsed once with fresh ethanol/water. The washed sample was dried at 120° C. for 7 hours.

Subsequent XRF analysis revealed that 74 wt.-% of the treatment agent was remaining on the sample surface. The treatment agent is well attached to the carbonate surface.

Example 9 (Inventive)

16.0 g of the surface treatment agent number 5 was diluted with an ethanol/water (1/1, wt.-%/wt.-%) blend to a concentration of 5 wt.-% and heated under stirring to 70-80° C. Under continuous stirring the heated emulsion is treated with 2.14 wt.-% solid potassium hydroxide (quantity dry potassium hydroxide based on the quantity of surface 5 treatment agent) and stirred for approximately 5 min.

400 g of dry ground calcium carbonate B was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (aqueous solution) to a value of 9.0. The pH adjustment was stopped when the pH was stable within ±0.2 units for 5 min, the reported pH values are the end values.

The suspension was heated to 90° C. (±5° C.) under constant stirring. 2 wt.-% of hydrolysed surface treatment agent 5 was added over a period of approximately 1 min. The blend was further stirred for 30 min at 90° C. The suspension was dried in an oven for 10 h at 120° C. to a moisture content of below 1 wt.-%. The resulting dry crumbles were deagglomerated in an IKA A 11 basic analytical mill for 1 min and stored afterwards in a sealed container.

The treated sample was further washed mixed with an ethanol/water (1/1, wt.-%/wt.-%) blend to a solids content of 20 wt.-% and heating it up to 80° C. The hot suspension was filtered and rinsed once with fresh ethanol/water. The washed sample was dried at 120° C. for 7 hours.

Subsequent XRF analysis revealed that 79 wt.-% of the treatment agent was remaining on the sample surface. The treatment agent is well attached to the carbonate surface.

Example 10 (Inventive)

16.0 g of the surface treatment agent number 6 was diluted with an ethanol/water (1/1, wt.-%/wt.-%) blend to a concentration of 5 wt.-% and heated under stirring to 70-80° C. Under continuous stirring the heated emulsion is treated with 2.9 wt.-% solid potassium hydroxide (quantity dry potassium hydroxide based on the quantity of surface 6 treatment agent) and stirred for approximately 5 min.

400 g of dry ground calcium carbonate B was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (aqueous solution) to a value of 9.5. The pH adjustment was stopped when the pH was stable within ±0.2 units for 5 min, the reported pH values are the end values.

The suspension was heated to 90° C. (±5° C.) under constant stirring. 2 wt.-% of hydrolysed surface treatment agent 6 was added over a period of approximately 1 min. The blend was further stirred for 30 min at 90° C. The suspension was dried in an oven for 10 h at 120° C. to a moisture content of below 1 wt.-%. The resulting dry crumbles were deagglomerated in an IKA A 11 basic analytical mill for 1 min and stored afterwards in a sealed container.

The treated sample was further washed mixed with an ethanol/water (1/1, wt.-%/wt.-%) blend to a solids content of 20 wt.-% and heating it up to 80° C. The hot suspension was filtered and rinsed once with fresh ethanol/water. The washed sample was dried at 120° C. for 7 hours.

Subsequent XRF analysis revealed that 78 wt.-% of the treatment agent was remaining on the sample surface. The treatment agent is well attached to the carbonate surface.

Example 11 (Inventive)

25.0 g of the surface treatment agent number 7 was diluted with an ethanol/water (1/1, wt.-%/wt.-%) blend to a concentration of 5 wt.-% and heated under stirring to 70-80° C. Under continuous stirring the heated emulsion is treated with 4.9 wt.-% solid potassium hydroxide (quantity dry potassium hydroxide based on the quantity of surface 7 treatment agent) and stirred for approximately 5 min.

400 g of surface reacted calcium carbonate A was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (aqueous solution) to a value of 9.5. The pH adjustment was stopped when the pH was stable within ±0.2 units for 5 min, the reported pH values are the end values.

The suspension was heated to 90° C. (±5° C.) under constant stirring. 5 wt.-% of hydrolysed surface treatment agent 7 was added over a period of approximately 1 min. The blend was further stirred for 30 min at 90° C. The suspension was dried in an oven for 10 h at 120° C. to a moisture content of below 1 wt.-%. The resulting dry crumbles were deagglomerated in an IKA A 11 basic analytical mill for 1 min and stored afterwards in a sealed container.

The treated sample was further washed mixed with an ethanol/water (1/1, wt.-%/wt.-%) blend to a solids content of 20 wt.-% and heating it up to 80° C. The hot suspension was filtered and rinsed once with fresh ethanol/water. The washed sample was dried at 120° C. for 7 hours.

Subsequent XRF analysis revealed that 84 wt.-% of the treatment agent was remaining on the sample surface. The treatment agent is well attached to the carbonate surface.

Example 12 (Inventive)

16.0 g of the surface treatment agent number 8 was diluted with an ethanol/water (1/1, wt.-%/wt.-%) blend to a concentration of 5 wt.-% and heated under stirring to 70-80° C. Under continuous stirring the heated emulsion is treated with 4.6 wt.-% solid potassium hydroxide (quantity dry potassium hydroxide based on the quantity of surface 8 treatment agent) and stirred for approximately 5 min.

400 g of surface reacted calcium carbonate A was mixed with 1 600 g deionized water in order to obtain a suspension of approximately 20 wt.-%. The suspension was stirred with a VISCO JET CRACK steered of 12 cm diameter (300 to 500 rpm; VISCO JET Rührsysteme GmbH, Germany) at room temperature. The pH was adjusted with calcium hydroxide (aqueous solution) to a value of 9.5. The pH adjustment was stopped when the pH was stable within ±0.2 units for 5 min, the reported pH values are the end values.

The suspension was heated to 90° C. (±5° C.) under constant stirring. 3 wt.-% of hydrolysed surface treatment agent 8 was added over a period of approximately 1 min. The blend was further stirred for 30 min at 90° C. The suspension was dried in an oven for 10 h at 120° C. to a moisture content of below 1 wt.-%. The resulting dry crumbles were deagglomerated in an IKA A 11 basic analytical mill for 1 min and stored afterwards in a sealed container.

The treated sample was further washed mixed with an ethanol/water (1/1, wt.-%/wt.-%) blend to a solids content of 20 wt.-% and heating it up to 80° C. The hot suspension was filtered and rinsed once with fresh ethanol/water. The washed sample was dried at 120° C. for 7 hours.

Hydrophobicity measurements of the dried powder showed that in a water/ethanol blend of 35/65 volume %/volume % 50 wt.-% of the material sank down to the bottom.

TABLE 3

Summary and results.

| Trial | Mineral pigment | Surface treatment agent | Surface treatment agent dosage[a] [wt.-%] | Base for hydrolysing surface treatment agent | Suspension pH | Base for the pH adjustment | Surface treatment agent before washing [wt.-%] | Surface treatment agent after washing[b] [wt.-%] | Hydrophobicity |
|---|---|---|---|---|---|---|---|---|---|
| 1 (comparative) | A | 1 | 2 | — | n.d. | — | 93 | 33 | n.d. |
| 2 (inventive) | A | 3 | 2 | NaOH | 10.5 | Ca(OH)$_2$ | 80 | 85 | n.d. |
| 3 (comparative) | A | 2 | 4 | — | 10.5 | Ca(OH)$_2$ | n.d. | n.d. | 90/10 |
| 4 (inventive) | A | 2 | 4 | NaOH | 10.5 | Ca(OH)$_2$ | n.d. | n.d. | 55/45 |
| 5 (inventive) | B | 2 | 0.5 | NaOH | 10.5 | Ca(OH)$_2$ | n.d. | n.d. | 55/45 (65/35)[c] |
| 6 (inventive) | B | 2 | 1 | NaOH | 10.5 | Ca(OH)$_2$ | n.d. | n.d. | 50/50 (50/50)[c] |
| 7 (comparative) | B | 2 | 2 | — | n.d. | — | n.d. | n.d. | 65/35 |
| 8 (inventive) | B | 4 | 2 | 2.5% KOH | — | — | — | 74 | |
| 9 (inventive) | B | 5 | 2 | 2.14% KOH | 9 | Ca(OH)$_2$ | — | 79 | |

TABLE 3-continued

Summary and results.

| Trial | Mineral pigment | Surface treatment agent | Surface treatment agent dosage[a] [wt.-%] | Base for hydrolysing surface treatment agent | Suspension pH | Base for the pH adjustment | Surface treatment agent before washing [wt.-%] | Surface treatment agent after washing[b] [wt.-%] | Hydrophobicity |
|---|---|---|---|---|---|---|---|---|---|
| 10 (inventive) | B | 6 | 2 | 2.9% KOH | 9 | Ca(OH)$_2$ | — | 78 | |
| 11 (inventive) | A | 7 | 5 | 4.9% KOH | 9-10 | Ca(OH)$_2$ | — | 83 | |
| 12 (inventive) | A | 8 | 3 | 4.6% KOH | 9-10 | Ca(OH)$_2$ | — | — | 35/65 |

[a] wt.-% referring to the mass of mineral pigment;
[b] referring to the amount before the washing step;
[c] after the washing step;
n.d. = not determined.

The data of examples 1 and 2 (Table 3) show that the surface treatment agent can be attached stronger to the surface of the calcium carbonate-comprising material when the process according to the present invention is used. As can be seen in Table 3 93 wt.-% of a surface-treatment agent can be located on the surface of a calcium carbonate-comprising material by a process known to the skilled person. However, after a washing step only 33 wt.-% of this surface-treatment agent are located on the surface which refers to a total amount of 31 wt.-%. Contrary to that 80 wt.-% of a surface-treatment agent can be located on the surface of a calcium carbonate-comprising material by the inventive process. After a washing step still 85 wt.-% of this surface-treatment agent are located on the surface which refers to a total amount of 68 wt.-%. Therefore, it has been shown that it is possible to attach a surface-treatment agent stronger to the surface of a calcium carbonate-comprising material by the inventive process. Due to this stronger attachment one is possible to produce a surface-treated calcium carbonate comprising material with a relative high amount of surface-treatment agent after the washing step on the surface of the calcium carbonate-comprising material.

The hydrophobicity as given in Table 3 is expressed as the water/ethanol ratio at which 50 wt.-% of the surface-treated calcium carbonate-comprising material sinks. In case that a high water content in the water/ethanol blend is needed to let 50 wt.-% of the surface-treated calcium carbonate-comprising material sink, the hydrophobicity of this material is low, whereas a lower amount of water in the water/ethanol blend for letting 50 wt.-% of the surface-treated calcium carbonate-comprising material sink means that this material has a high hydrophobicity. The hydrophobicity of the surface-treated calcium carbonate-comprising material correlates directly with the quality of the surface treatment of the calcium carbonate-comprising material. The comparison of the inventive trials 4 to 6 with comparative examples 3 and 7 shows that the process according to the present invention allows to manufacture surface-treated calcium carbonate-comprising material with improved hydrophobicity. Therefore, the data show that, by applying the inventive process surface-treated calcium carbonate-comprising materials with an improved quality of surface-treatment can be obtained.

The invention claimed is:

1. A process for surface-treatment of a calcium carbonate-comprising material, the process comprising the steps of:
   a) providing an aqueous suspension of at least one calcium carbonate-comprising material having a solids content in the range from 5 to 90 wt.-%, based on the total weight of the aqueous suspension,
   b) adjusting the pH-value of the aqueous suspension of step a) to a range from 7.5 to 12,
   c) adding at least one surface-treatment agent to the aqueous suspension obtained in step b) in an amount ranging from 0.05 to 10 mg surface treatment agent per m$^2$ of the surface area of the at least one calcium carbonate-comprising material as provided in step a), wherein the at least one surface treatment agent is a compound according to Formula (I),

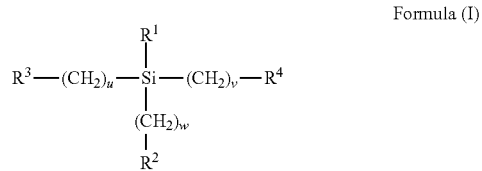

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group and a benzoyl group, and u, v and w are independently from each other an integer from 0 to 24,
   d) mixing the aqueous suspension obtained in step c) for a period of time ranging from 1 second to 60 minutes at a temperature in the range from 30 to 120° C., and
   e) drying the aqueous suspension during or after step d) at a temperature in the range from 40 to 160° C. at ambient or reduced pressure until the moisture content of a surface-treated calcium carbonate-comprising material is in the range from 0.001 to 20 wt.-%, based on the total weight of the surface-treated calcium carbonate-comprising material, wherein (i) the surface-treated calcium carbonate-comprising material has a hydrophobicity of below 1.7:1 volumetric ratio of water:ethanol measured at 23° C. (±2° C.) with a sedimentation method and (ii) at least 68 wt % of the surface treatment agent added in step c) is bound to the calcium carbonate comprising material.

2. The process according to claim 1, wherein the pH-value in step b) is adjusted to the range from 7.5 to 12 by adding at least one base.

3. The process according to claim 2, wherein the at least one base of step b) is selected from the group consisting of calcium hydroxide, magnesium hydroxide, calcium hydrogen carbonate, sodium hydroxide, potassium hydroxide, lithium hydroxide, ammonium hydroxide, primary amines, secondary amines and tertiary amines and mixtures thereof.

4. The process according to claim 1, wherein the at least one calcium carbonate-comprising material is selected from the group consisting of ground calcium carbonate, preferably marble, limestone, dolomite, chalk, precipitated calcium carbonate, vaterite, calcite, aragonite, surface-reacted calcium carbonate, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by a $H_3O^+$ ion donor treatment and/or is supplied from an external source and mixtures thereof.

5. The process according to claim 1, wherein mechanical dewatering, centrifugation or filtration, is carried out during step d), and/or the surface-treated calcium carbonate-comprising material is washed with water during and/or after step d).

6. The process according to claim 1, wherein the process comprises a further step f) of adding at least one base to the aqueous suspension during or after step c) to readjust the pH-value to the range from 7.5 to 12.

7. The process according to claim 6, wherein the at least one base added in step f) is selected from the group consisting of lithium hydroxide, sodium hydroxide, potassium hydroxide, calcium hydroxide, magnesium hydroxide and mixtures thereof.

8. The process according to claim 1, wherein (a) $R^1$, $R^2$, $R^3$ and/or $R^4$ are independently from each other a methoxy or an ethoxy group and/or (b) the at least one surface-treatment agent is selected from triethoxysilane, trimethoxysilane, triethoxyvinylsilane, trimethoxyvinylsilane, 3-(2,3-epoxypropoxy)propyl-trimethoxysilane, triethoxysilylpropyltetrasulphide, 3-mercaptopropyltrimethoxysilane, 3-methacryloxypropyltrimethoxysilane, 3-aminopropyltriethoxysilane, methyltriethoxysilane, 3-glycidoxypropyltrimethoxysilane, dodecyltriethoxysilane, n-octadecyltriethoxysilane, phenyltriethoxysilane, 3-butenyltriethoxysilane and combinations thereof.

9. The process according to claim 1, wherein the solids content of the aqueous suspension of step a) is in the range from 10 to 70 wt.-%, based on the total weight of the aqueous suspension; and/or the calcium carbonate-comprising material is a surface-reacted calcium carbonate and the specific surface area of the surface-reacted calcium carbonate as measured by the BET nitrogen method according to ISO 9277:2010 is in the range from 1 to 250 $m^2/g$ or the calcium carbonate-comprising material is a ground calcium carbonate or a precipitated calcium carbonate and the specific surface area of the ground calcium carbonate or the precipitated calcium carbonate as measured by the BET nitrogen method according to ISO 9277:2010 is in the range from 1 to 100 $m^2/g$.

10. The process according to claim 1, wherein the pH-value is adjusted in process step b) to the range from 7.8 to 11.5.

11. The process according to claim 1, wherein the amount of the at least one surface-treatment agent added in step c) is in the range from 0.07 to 9 mg surface-treatment agent per $m^2$ of the surface area of the calcium carbonate-comprising material.

12. The process according to claim 1, wherein step d) is carried out at a temperature in the range from 45 to 115° C.

13. The process according to claim 1, wherein step e) is carried out until the moisture content of the surface-treated calcium carbonate-comprising material is in the range from 0.005 to 15 wt.-%, based on the total weight of the surface-treated calcium carbonate-comprising material.

14. The process according to claim 1, wherein step e) is carried out at a temperature in the range from 50 to 155° C.

15. The process according to claim 1, wherein the process comprises a further step after or during step e) of deagglomerating the surface-treated calcium carbonate-comprising material of step d) or e).

16. The process according to claim 1, wherein all process steps are fully or partially batch or continuous processes.

* * * * *